US011165311B2

(12) United States Patent
Hattori et al.

(10) Patent No.: US 11,165,311 B2
(45) Date of Patent: Nov. 2, 2021

(54) MOTOR AND ELECTRIC POWER STEERING DEVICE

(71) Applicant: Nidec Corporation, Kyoto (JP)

(72) Inventors: Takashi Hattori, Kyoto (JP); Takahiro Kizu, Kyoto (JP); Toshiya Okamoto, Kyoto (JP); Yuichi Nishikawa, Kyoto (JP); Yoshiaki Yamashita, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 165 days.

(21) Appl. No.: 16/611,996

(22) PCT Filed: Dec. 7, 2017

(86) PCT No.: PCT/JP2017/043963
§ 371 (c)(1),
(2) Date: Nov. 8, 2019

(87) PCT Pub. No.: WO2018/211726
PCT Pub. Date: Nov. 22, 2018

(65) Prior Publication Data
US 2021/0143708 A1    May 13, 2021

(30) Foreign Application Priority Data

May 17, 2017  (JP) .............................. JP2017-098500

(51) Int. Cl.
*H02K 9/22*         (2006.01)
*H02K 11/33*        (2016.01)
(Continued)

(52) U.S. Cl.
CPC ............. *H02K 9/227* (2021.01); *H02K 3/522* (2013.01); *H02K 5/225* (2013.01); *H02K 7/083* (2013.01);
(Continued)

(58) Field of Classification Search
CPC ............ H02K 9/227; H02K 3/50; H02K 5/26; H02K 5/1732; H02K 11/33; H02K 11/30;
(Continued)

(56) References Cited

U.S. PATENT DOCUMENTS

| 10,050,493 B2 | 8/2018 | Kabune |
| 10,424,994 B2 | 9/2019 | Kabune |

(Continued)

FOREIGN PATENT DOCUMENTS

| CN | 103812276 A | 5/2014 |
| CN | 107529347 A | 12/2017 |
| JP | 5373949 B1 | 12/2013 |

OTHER PUBLICATIONS

Official Communication issued in corresponding Chinese Patent Application No. 201780090851.1, dated Jan. 6, 2021.

(Continued)

*Primary Examiner* — Quyen P Leung
*Assistant Examiner* — Alexander A Singh
(74) *Attorney, Agent, or Firm* — Keating & Bennett

(57) ABSTRACT

A motor includes a heat sink including a first portion and a second portion located on a circumference identical to the first portion and extending along a circumferential direction. An axial thickness of the first portion is larger than an axial thickness of the second portion. A lower surface of the second portion is located axially above a lower surface of the first portion. A busbar is located axially below the second portion.

14 Claims, 21 Drawing Sheets

(51) Int. Cl.
    *H02K 11/40* (2016.01)
    *H02K 3/52* (2006.01)
    *H02K 5/22* (2006.01)
    *H02K 7/08* (2006.01)
    *B62D 5/04* (2006.01)

(52) U.S. Cl.
    CPC .............. *H02K 11/33* (2016.01); *H02K 11/40* (2016.01); *B62D 5/0403* (2013.01); *B62D 5/0409* (2013.01); *H02K 2203/06* (2013.01); *H02K 2203/09* (2013.01); *H02K 2211/03* (2013.01)

(58) Field of Classification Search
    CPC ........ H02K 11/38; H02K 3/522; H02K 5/225; H02K 7/083; H02K 11/40; H02K 2203/06; H02K 2203/09; H02K 2211/03; H02K 9/22; H02K 9/223; B62D 5/0409; B62D 5/0403
    USPC .................................. 310/68 R, 68 D, 64, 65
    See application file for complete search history.

(56) References Cited

U.S. PATENT DOCUMENTS

| | | | |
|---|---|---|---|
| 2008/0211332 A1* | 9/2008 | Kataoka | H02K 7/083 310/71 |
| 2011/0043057 A1 | 2/2011 | Ota | |
| 2012/0229005 A1* | 9/2012 | Tominaga | H02K 11/38 310/68 B |
| 2014/0125173 A1 | 5/2014 | Hayashi | |
| 2016/0218596 A1 | 7/2016 | Hayashi | |
| 2018/0127020 A1 | 5/2018 | Asao et al. | |
| 2019/0016371 A1* | 1/2019 | Urimoto | H02K 3/50 |
| 2019/0207488 A1* | 7/2019 | Ichikawa | H02K 11/0141 |

OTHER PUBLICATIONS

Official Communication issued in International Patent Application No. PCT/JP2017/043963, dated Feb. 20, 2018.

* cited by examiner (A)

(B)

(C)

(A)

(B)

MOTOR AND ELECTRIC POWER STEERING DEVICE

CROSS REFERENCE TO RELATED APPLICATIONS

This is a U.S. national stage of PCT Application No. PCT/JP2017/043963, filed on Dec. 7, 2017, and priority under 35 U.S.C. § 119(a) and 35 U.S.C. § 365(b) is claimed from Japanese Application No. 2017-098500, filed May 17, 2017, the entire contents of each application are hereby incorporated herein by reference.

1. FIELD OF THE INVENTION

The present disclosure relates to a motor and an electric power steering device.

2. BACKGROUND

An electromechanically integrated motor is known in which a motor main body having a rotor and a stator, and a control unit having an electronic component that controls the motor main body and a board are integrally disposed. A motor including a frame member having a function of holding a bearing and a function of a heat sink that dissipates heat of a heat generating element has been known.

SUMMARY

One example embodiment of a motor of the present disclosure includes a rotor including a shaft extending in an axial direction, a stator surrounding a radially outer side of the rotor, a heat sink axially above the stator, and a board that is axially above the heat sink and on which an electronic component is mounted. The stator includes a coil around which a coil wire is wound and a busbar to which the coil wire is connected. The heat sink includes a first portion and a second portion that is located on a circumference identical to the first portion and that extends along a circumferential direction. An axial thickness of the first portion is larger than an axial thickness of the second portion. A lower surface of the second portion is located axially above a lower surface of the first portion. The busbar is located axially below the second portion.

The above and other elements, features, steps, characteristics and advantages of the present disclosure will become more apparent from the following detailed description of the example embodiments with reference to the attached drawings.

DETAILED DESCRIPTION

Figure 1:
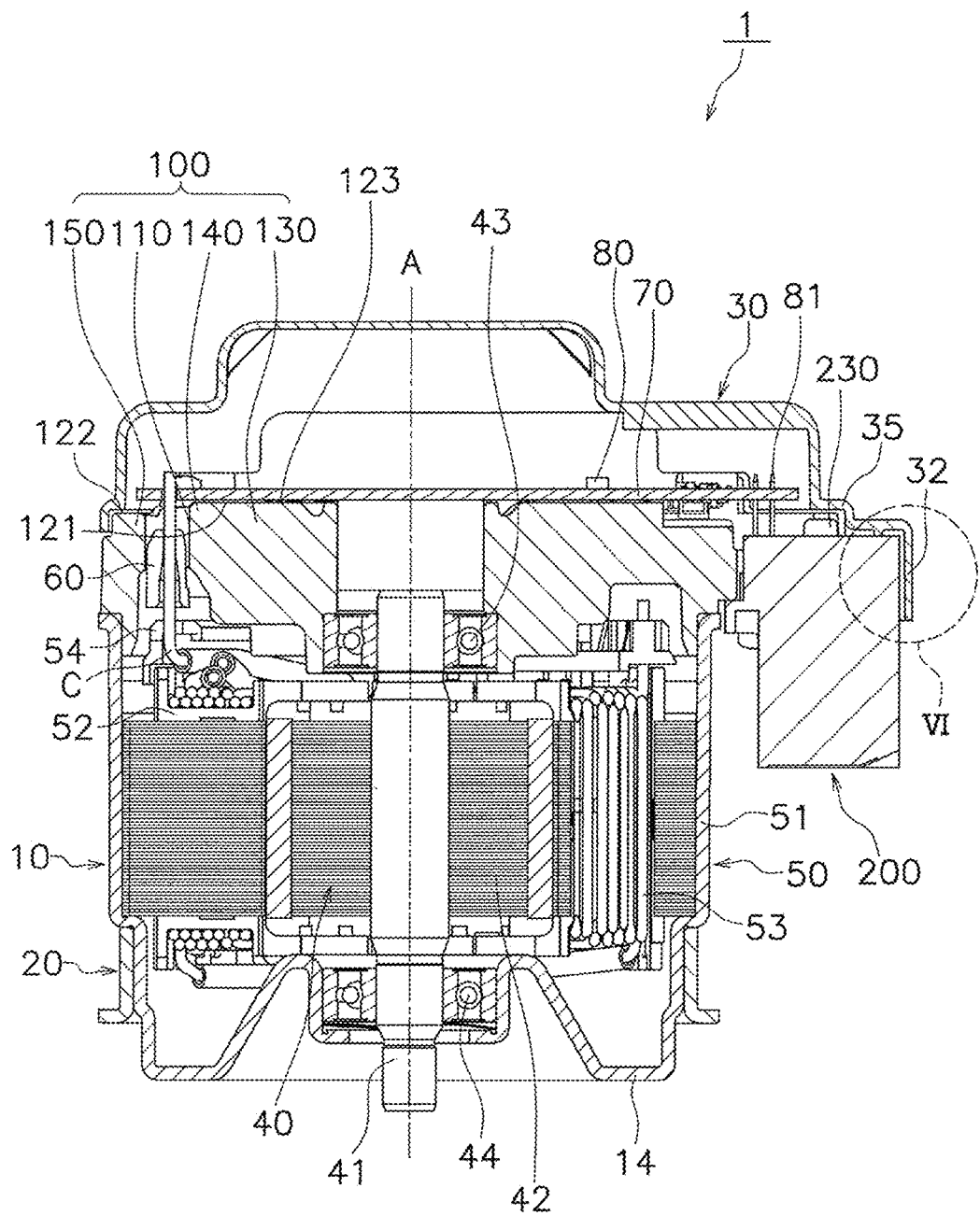
FIG. 1 is a cross-sectional view of a motor according to a first example embodiment of the present disclosure.

Hereinafter, example embodiments of the present disclosure will be described with reference to the drawings. In the following drawings, the same or corresponding parts are denoted by the same reference numerals, and description thereof will not be repeated.

In the following explanation, as shown in FIG. 1, a center axis A of a rotor, that is, an axial direction in which a shaft extends is a vertical direction, and a board side is an upper side, a bottom side of a housing is a lower side. However, the vertical direction in this specification is for use in specifying the positional relationship, and does not limit the actual direction. That is, a downward direction does not necessarily mean the direction of gravity.

The direction perpendicular to the center axis A of the rotor is a radial direction, and the radial direction is centered on the center axis A. A circumferential direction is the axis around the center axis A of the rotor.

Furthermore, the description of "axially extending" in the present specification refers to a state of strictly extending in the axial direction and a state of extending in a direction inclined at less than 45 degrees with respect to the axial direction. Similarly, the description of "extending in the radial direction" in the present specification refers to a state of extending in the radial direction strictly and a state of extending in a direction inclined at less than 45 degrees with respect to the radial direction.

Further, in this specification, "fitting" means fitting components in fitted shape. The "fitted shape" includes a state where the shape is the same, a state where the shape is similar, and a state where the shapes are different. In the case where the fitted shape is a projection-recess shape, at least part of the projection is located in the recess.

In the present specification, a "gap" means a clearance that is intentionally provided. That is, the clearance designed with members not in contact with each other is defined as the gap.

A motor according to an example embodiment of the present disclosure will be described with reference to FIGS. 1 to 28. The motor according to the first example embodiment has a two-system configuration having two sets of U-phase, V-phase, and W-phase.

As shown in FIG. 1, a motor 1 mainly includes a housing 10, a flange 20, a cover 30, a rotor 40, bearings 43 and 44, a stator 50, a coil support member 60, a control unit having a board 70 and an electronic component 80, a heat sink 100, and a connector 200.

As shown in FIG. 1, the housing 10 accommodates the rotor 40, the stator 50, and the bearings 43 and 44 therein. The housing 10 extends in the axial direction and opens upward.

Figure 2:
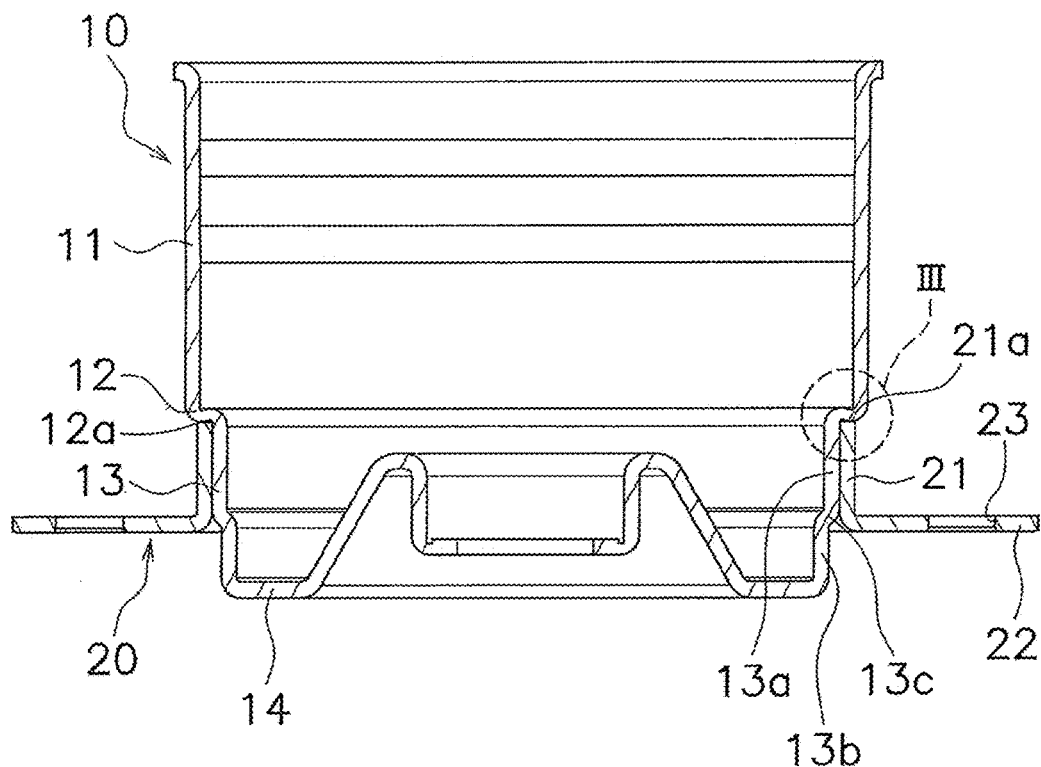
FIG. 2 is a cross-sectional view of a housing and a flange according to the first example embodiment.

As shown in FIG. 2, the housing 10 includes a first tube portion 11, a contact portion 12, a second tube portion 13, and a bottom portion 14. The housing 10 of the present example embodiment is a press-molded product. Further, the first tube portion 11, the contact portion 12, the second tube portion 13, and the bottom portion 14 have the same thickness. Note that "the same" means that components are not intentionally formed with different thicknesses, and the difference in thickness due to drawing in press molding is regarded as the same.

The first tube portion 11 and the second tube portion 13 are tubular with the center axis A as the center. The tubular shape is a hollow shape, and may be circular or polygonal in plan view. The first tube portion 11 accommodates the stator 50 therein.

The contact portion 12 extends radially inward from the lower end of the first tube portion 11 in the axial direction. The stator 50 comes into contact with the inner upper face of the contact portion 12.

Figure 3:
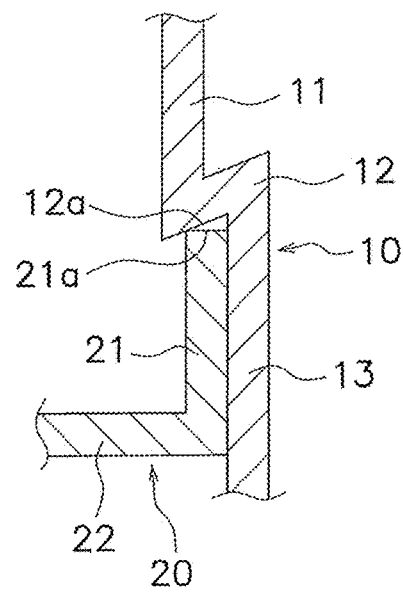
FIG. 3 is an enlarged view of a region corresponding to region III in FIG. 2 in a motor of a modification of the first example embodiment.
Figure 4:
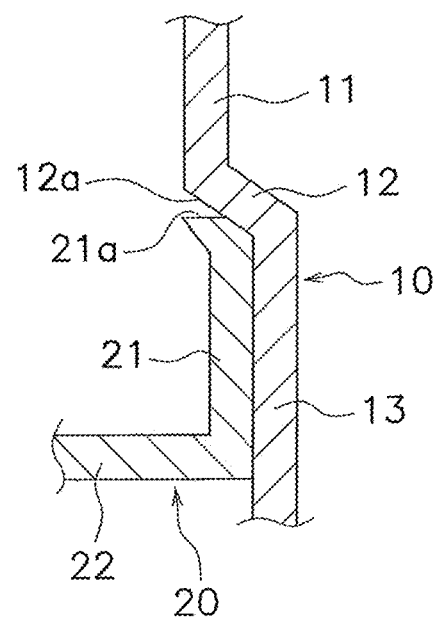
FIG. 4 shows another modification of FIG. 3.

A housing lower surface 12a of the contact portion 12 is a flat face extending in the radial direction as shown in FIG. 2. The housing lower surface 12a of the contact portion 12 may extend axially upward as it goes radially inward from the first tube portion 11 as shown in FIG. 3, or may extend axially downward as it goes radially inward from the first tube portion 11 as shown in FIG. 4. Further, the housing lower surface 12a of the contact portion 12 may be a curved surface (not shown).

The second tube portion 13 has a tubular shape that extends axially downward from the radially inner end of the contact portion 12 and has an outer diameter smaller than that of the first tube portion 11. The second tube portion 13 includes an upper tube portion 13a, a lower tube portion 13b, and a connection portion 13c. The lower tube portion 13b has an outer diameter smaller than that of the upper tube portion 13a. The connection portion 13c connects the upper tube portion 13a and the lower tube portion 13b.

The bottom portion 14 extends radially inward from the lower end of the second tube portion 13 in the axial direction. The bottom portion 14 closes the housing 10.

As shown in FIGS. 1 and 2, the flange 20 is attached to the outer face of the housing 10.

As shown in FIG. 2, the flange 20 includes a flange tube portion 21 and a flange plane portion 22. The flange 20 of the present example embodiment is a press-molded product. Further, the flange tube portion 21 and the flange plane portion 22 have the same thickness.

The flange tube portion 21 is fixed to the outer face of the second tube portion 13 of the housing 10. The flange tube portion 21 has a tubular shape centered on the center axis A and has an outer diameter larger than that of the second tube portion 13. An axial length of the flange tube portion 21 is shorter than an axial length of the second tube portion 13.

As shown in FIGS. 2 and 3, the flange tube portion 21 may have an outer face and an inner face that extend along the axial direction. Further, as shown in FIG. 4, the flange tube portion 21 may be inclined at the upper part of the outer face and the inner face.

The flange plane portion 22 extends radially outward from the lower end of the flange tube portion 21 in the axial direction. The flange plane portion 22 protrudes radially outward of the first tube portion 11 when viewed from the upper side in the axial direction. The flange plane portion 22 has fixing holes 23 for fixing an external device of the motor 1 at a plurality of locations.

As shown in FIGS. 1 to 4, an upper end 21a of the flange tube portion 21 comes into contact with the housing lower surface 12a of the contact portion 12 of the housing 10. That is, at least part of the upper end 21a of the flange tube portion 21 and at least part of the housing lower surface 12a of the contact portion 12 come into contact with each other.

In the contact structure shown in FIG. 2, the housing lower surface 12a of the contact portion 12 is a flat face extending in the radial direction, the upper end 21a of the flange tube portion 21 is a flat face extending in the radial direction, and at least part of the flat face of the contact portion 12 and at least part of the flat face of the flange tube portion come into contact with each other.

In the contact structure shown in FIG. 3, the contact portion 12 extends axially upward as it goes radially inward from the first tube portion 11. Since the upper end 21a of the flange tube portion 21 is a flat face extending in the radial direction, a corner portion between the upper end face and the inner face of the flange tube portion 21 is fitted into the contact portion 12. Therefore, the housing 10 is less likely to come out of the flange 20.

In the contact structure shown in FIG. 4, the contact portion 12 extends axially downward as it goes radially inward from the first tube portion 11. The upper end 21a of the flange tube portion 21 is brought into contact with the housing lower surface 12a of the contact portion 12 and extends axially outward along the contact portion 12. Therefore, the housing 10 is less likely to come out of the flange 20.

Figure 5:
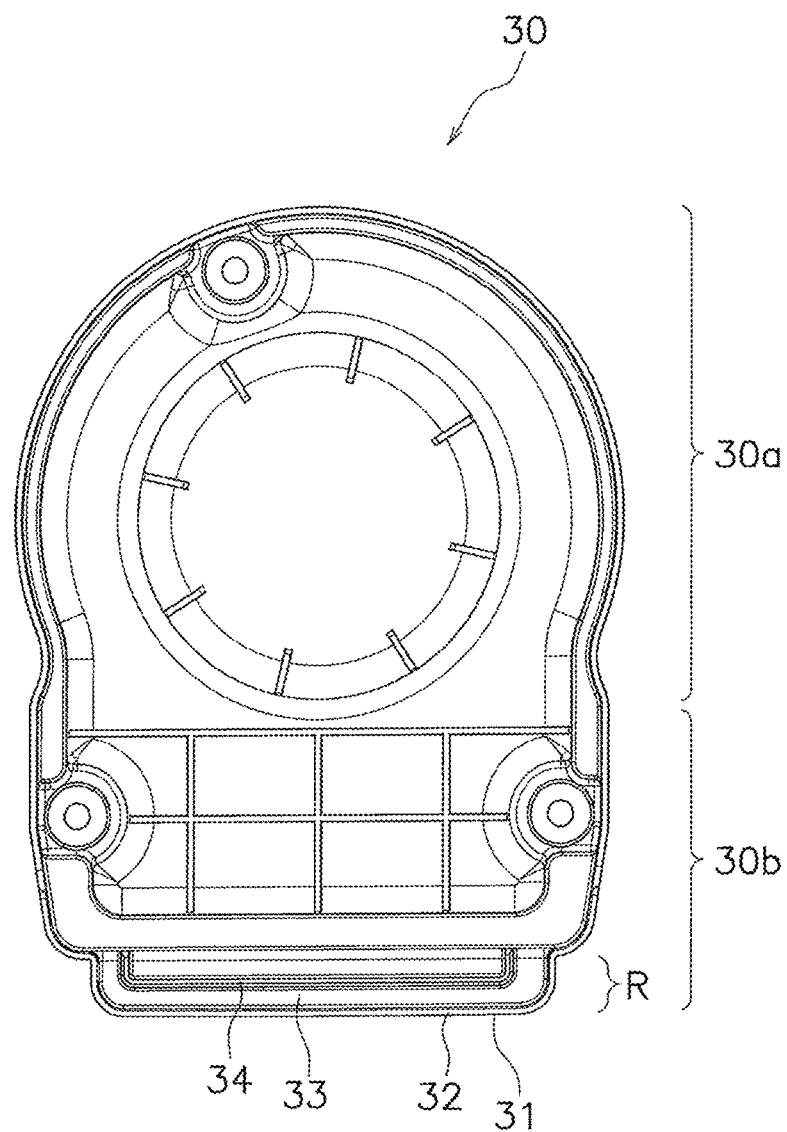
FIG. 5 is a bottom view of a cover according to the first example embodiment.

As shown in FIG. 1, the cover 30 covers at least part of the upper side of the board 70 and the connector 200 in the axial direction. As shown in FIG. 5, the cover 30 includes a disc-shaped portion 30a that overlaps the housing 10 and a rectangular portion 30b facing the connector when viewed from the upper side in the axial direction. The rectangular portion 30b includes an outer end region R having a cover outer end edge 31 that is a radially outer end edge. The "cover outer end edge 31" means the outer end (the end of the cover 30), and the "outer end region R" means a predetermined region including the cover outer end edge 31 and extending from the cover outer end edge 31 to the inside.

Figure 6:
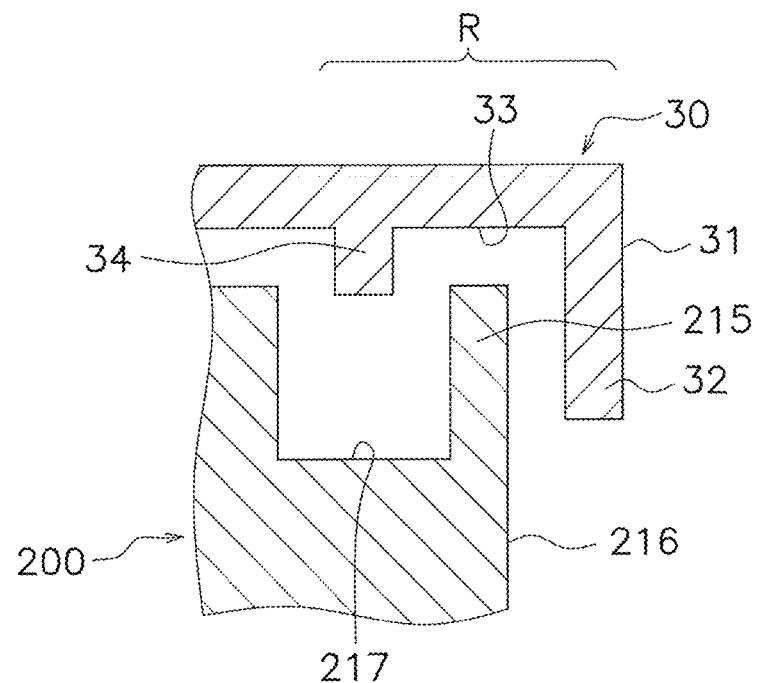
FIG. 6 is an enlarged view of region VI in FIG. 1.

As shown in FIGS. 5 and 6, the cover 30 includes a covering wall 32, a cover recess 33, a cover projection 34, and a cover step 35 (see FIG. 1).

The covering wall 32 extends axially downward from the cover outer end edge 31 which is a radially outer end edge, and covers at least part of a connector outer end edge 216 which is a radially outer end edge of the connector 200 described later.

The cover recess 33 is formed radially inside with respect to the covering wall 32 and is recessed in the axial direction. As shown in FIG. 6, the upper side of the cover recess 33 in the axial direction is a flat face. The cover recess 33 shown in FIG. 6 is formed by the radially inner face of the covering wall 32 and the radially outer face of the cover projection 34.

The cover projection 34 extends axially downward on the radially inside with respect to the cover recess 33. Specifically, the cover projection 34 extends in a longitudinal direction of the connector (left-right direction in FIG. 5) and further extends in a short direction (vertical direction in FIG. 5) from both ends in the longitudinal direction. As shown in FIG. 6, the lower side of the cover projection 34 in the axial direction is a flat face. The lower surface of the cover projection 34 is located below the board 70. Further, the lower surface of the cover projection 34 is located at a height in the axial direction equal to or below a height of the upper face of a connector projection 215 described later.

The cover step 35 is located radially inside of the cover projection 34 and is recessed axially upward.

The cover recess 33, the cover projection 34, and the cover step 35 are configured by a plurality of flat faces, but may be configured by curved surfaces.

Figure 7:
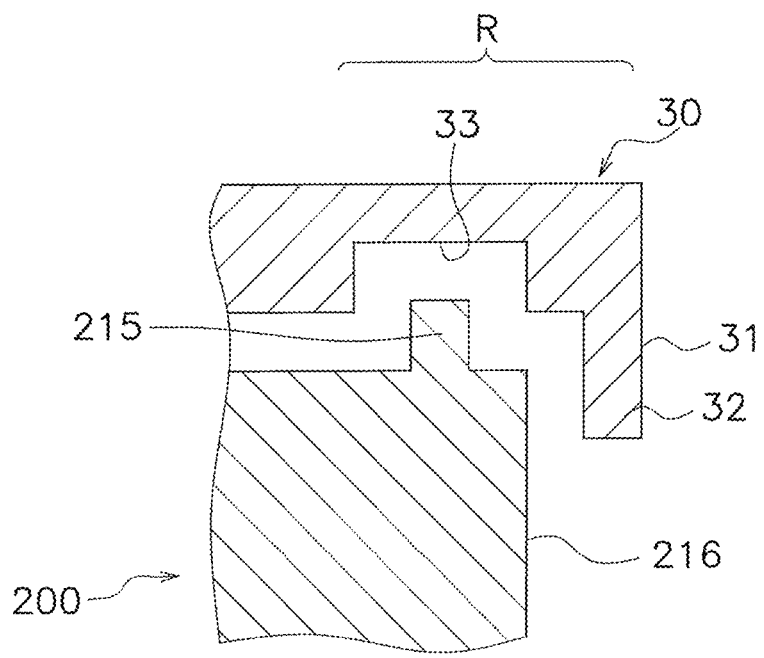
FIG. 7 shows a modification of FIG. 6.
Figure 8:
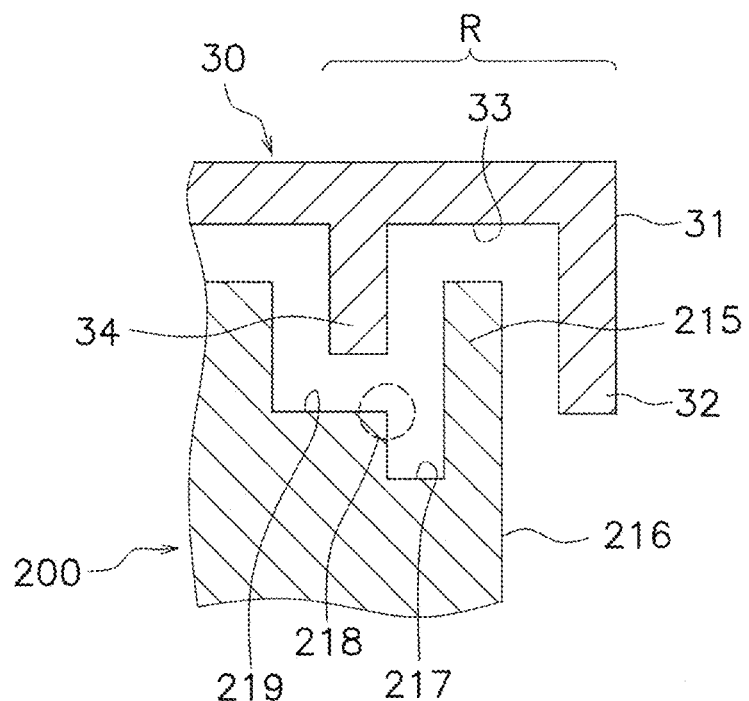
FIG. 8 shows another modification of FIG. 6.
Figure 9:
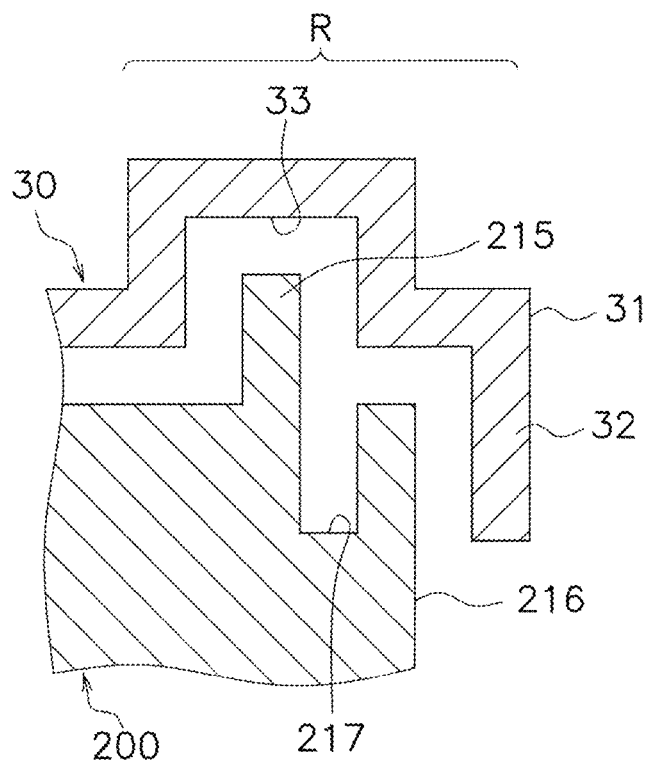
FIG. 9 shows still another modification of FIG. 6.

Further, modifications of the structure of the outer end region R of the cover 30 will be described with reference to FIGS. 7 to 9. In FIG. 7, the cover recess 33 is not formed by the inner face of the covering wall 32, and is recessed axially upward with a space from the covering wall 32. In FIG. 8, the axially downward protruding lengths of the covering wall 32 and the cover projection 34 are substantially the same. In FIG. 9, a step structure is provided between the covering wall 32 and the cover recess 33.

As shown in FIG. 1, the rotor 40 includes a shaft 41 and a rotor core 42. The shaft 41 has a substantially cylindrical shape with the center axis A, as the center, extending in the axial direction. The rotor core 42 is fixed to the shaft 41. The rotor core 42 surrounds the radially outer side of the shaft. The rotor core 42 rotates together with the shaft 41.

As shown in FIG. 1, the bearings 43 and 44 support the shaft 41 in a rotatable manner. The bearing 43 disposed on the axially upper side is located axially above the stator 50 and is held by the heat sink 100. The bearing 44 disposed on the axially lower side is held by the bottom portion 14 of the housing 10.

As shown in FIG. 1, the stator 50 surrounds the radially outer side of the rotor 40. Stator 50 includes a stator core 51, an insulator 52, a coil 53, a busbar B, and a busbar holding member 54.

Figure 10:
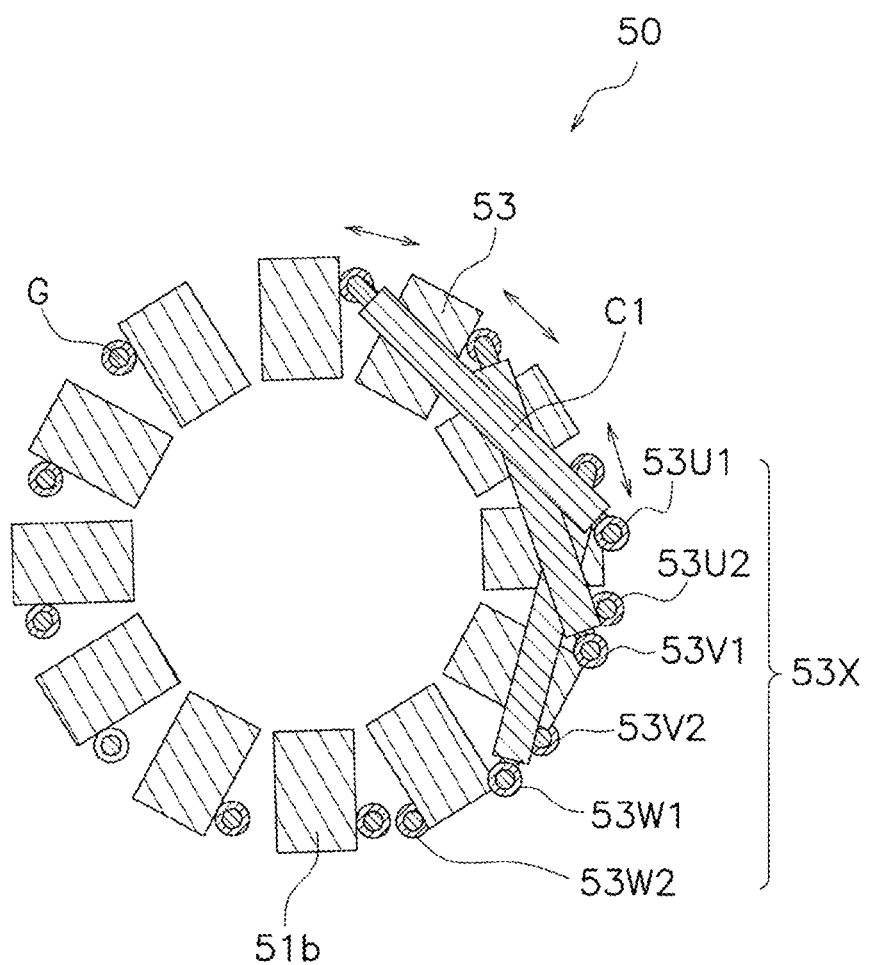
FIG. 10 is a schematic diagram of a stator according to the first example embodiment.

Referring to FIGS. 1 and 10, the stator core 51 includes an annular core back and teeth 51b. The core back has a tubular shape concentric with the center axis A, and may be divided in the circumferential direction. The teeth 51b extend radially inward from the inner face of the core back. A plurality of the teeth 51b are provided and disposed with a gap (slot) therebetween in the circumferential direction. That is, the slot is provided between the teeth 51b adjacent in the circumferential direction.

The insulator 52 covers at least part of the stator core 51. The insulator 52 is formed of an insulator and is attached to each tooth 51b.

The coil 53 excites the stator core 51 and is configured by winding a coil wire C. Specifically, the coil wire C is wound around each tooth 51b via the insulator 52, and the coil 53 is disposed on each tooth 51b. That is, the coil wire C is concentrically wound. In the present example embodiment, the coil wire C is wound around each of two different teeth 51b in a concentrated manner—so-called two teeth in winding. The coil wire C is located radially inside with respect to the radially outer end of the busbar holding member 54.

Specifically, the coil wire C is wound around each of the teeth 51b by concentrated winding via the insulator 52, so that twelve coils 53 are formed. These twelve coils 53 are composed of six coil sets including two coils 53 connected by one coil wire C.

After the coil set is wound around one of the teeth 51, the coil set is wound around the other tooth with an interval of two between the teeth 51. In other words, a crossover wire is disposed over two teeth 51 on the axially lower side of the coil 53. In other words, two other coils 53 are disposed between the coils in one set of coils.

In the present example embodiment, the stator 50 is configured by coil sets each including two coils having the same winding direction. In the coil set consisting of two coils, one coil is formed by winding a coil wire a predetermined number of times counterclockwise (or clockwise) around one tooth when viewed from the radially inside, and the other coil is formed by winding a coil wire around the other tooth in the same direction via a crossover wire that is disposed over the axially lower side of the coil.

A ground wire end G, which is one end of the coil wire C of the present example embodiment, is connected to the busbar B. An output wire end 53X, which is the other end of the coil wire C, is inserted into the coil support member 60 described later and connected to the board 70. The ground wire end G is the end of the coil wire C on the ground side. The output wire end 53X is the end of the coil wire C on the output side.

The output wire end 53X, which is the other end of the coil wire C of the present example embodiment, is part of the lead wire drawn from the coil 53. Specifically, as shown in FIG. 10, the output wire end 53X is six lead wires 53U1, 53U2, 53V1, 53V2, 53W1, and 53W2 constituting U phase, V phase, and W phase in the first and second systems. The lead wires 53U1, 53U2, 53V1, 53V2, 53W1, and 53W2 drawn from the stator 50 are inserted into a through hole 65 (see FIG. 13) of the coil support member 60 described later and a heat sink through hole 110 (see FIG. 18), and are electrically connected to the control unit by a method such as soldering.

When the motor 1 is driven, the current is passed through the lead wires 53U1, 53V1, and 53W1 constituting U phase, the V phase, and the W phase phases in the first system, and the current is also passed through the lead wires 53U2, 53V2, and 53W2 constituting U-phase, V-phase, and W-phase phases in the second system. With this configuration, for example, even when the electricity to the coil to one system is stopped due to an inverter failure, etc. when the motor 1 is driven, since the coil in the other system can be energized, so that the motor 1 can be driven.

As shown in FIG. 10, the coil wire C includes a crossover portion C1 extending in the circumferential direction that connects the coil 53 and the output wire end 53X. Further, the stator 50 includes the crossover portion C1 disposed axially above the coil and a tube through which the crossover wire disposed axially below the coil passes. The tube is formed of an insulating material. The crossover portion C1 is located axially below the heat sink 100.

In FIG. 10, by running the crossover portion C1 axially above the stator with respect to the coil wire drawn out to the slot, the output wire end 53X is collected, and the ground wire end is also collected. In the present example embodiment, the lead wires 53U1, 53U2, 53V1, 53V2, 53W1, and 53W2 are collected in a region of 180 degrees or less around the shaft by the crossover portion C1.

When the output wire end 53X is collected by the crossover portion C1, the number of lead wires run by the crossover portion C1 is "the number of slots/2−{the number of phases×(the number of systems−1)}". In the case of the three-phase, two-line system according to the present example embodiment, the number of lead wires run by the crossover portion C1 is 12/2−{3×(2−1)}=3. Further, the number of lead wires run by the crossover portion C1 is the same as the number of slots from which the coil wire C is not drawn immediately above. At this time, a space for accommodating the heat sink 100 can be secured above the stator 50 for the number of slots from which the coil wire C is not drawn immediately above. That is, above the stator 50, the space for accommodating the heat sink 100 can be secured in the circumferential direction for the three slots (arrows in FIG. 10). Thereby, since the heat sink 100 can be disposed close to the stator 50, the height of the entire motor 1 in the axial direction can be suppressed.

In the present example embodiment, while an example of a structure in which the crossover portion C1 connects the coil 53 and the output wire end 53X has been described, the crossover portion of the present disclosure may connect the coil 53 and the ground wire end G.

Figure 11:
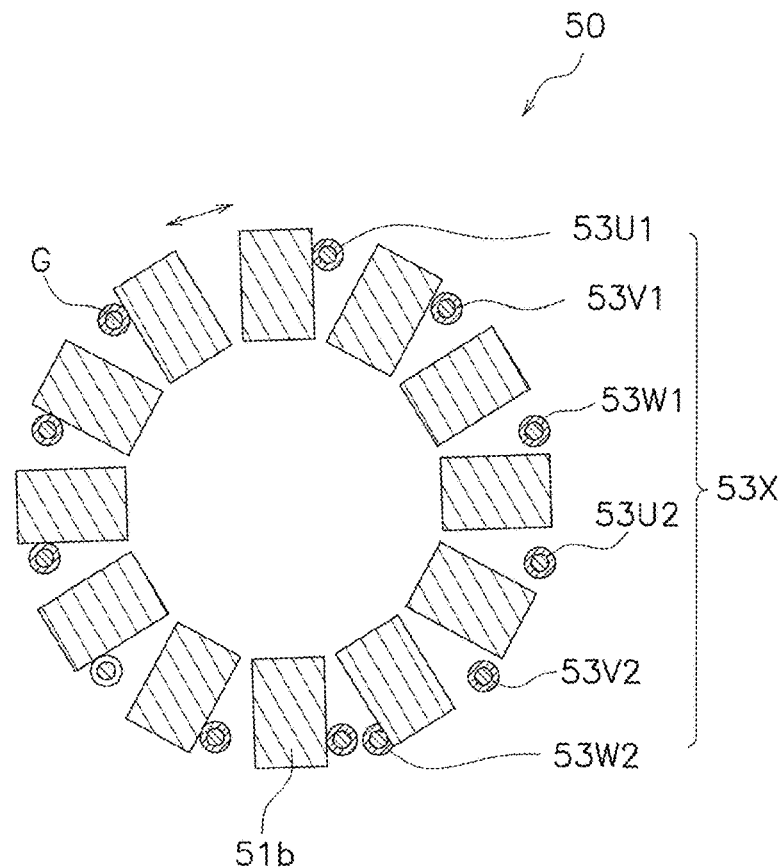
FIG. 11 shows a modification of FIG. 9.

Further, as shown in FIG. 11, the crossover portion C1 may be omitted. In the structure shown in FIG. 11, at least one of the output wire end 53X is drawn from the slot identical to the other ground wire end G. Therefore, one slot (arrow in FIG. 11) from which the coil wire is not drawn can be formed.

In addition, although the motor 1 in the present example embodiment has a two-system configuration including two sets of U-phase, V-phase, and W-phase, the number of systems can be arbitrarily designed. That is, the motor 1 may have a single system, or three or more systems.

The busbar B is a member formed of a conductive material that electrically connects the coil wires led out from the coil 53 to each other. The busbar B in the present example embodiment is a metal thin plate and is a neutral point busbar in star connection. The busbar B is disposed on the axially lower side of a second portion 142 (see FIG. 19) of the heat sink 100 described later. The busbar B extends in the circumferential direction along the second portion 142 (see FIG. 19).

Figure 12:
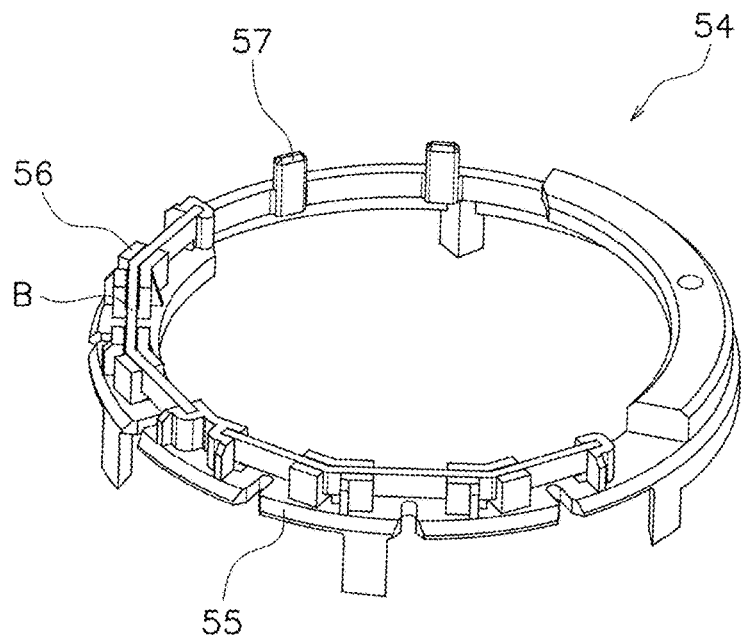
FIG. 12 is a perspective view of a busbar holding member according to the first example embodiment.

The busbar holding member 54 shown in FIG. 12 holds the busbar B. The busbar holding member 54 is made of an insulating material. As shown in FIG. 1, the busbar holding member 54 is fixed to the radially outer side of the insulator 52 or the axially upper side of the core back. The busbar holding member 54 and the bearing 43 overlap in the radial direction.

As shown in FIG. 12, the busbar holding member 54 includes a ring-shaped base portion 55, a holding portion 56 that holds the busbar B, and a busbar projection 57. The busbar projection 57 and the holding portion 56 extend axially upward from part of the base portion 55 and are provided at different positions in the circumferential direction.

The stator 50 has a stator fitting portion which is a projection or a recess extending in the axial direction. In the present example embodiment, the stator fitting portion is the busbar projection 57 formed in the busbar holding member and extending in the axial direction. Note that the stator fitting portion may be a recess (not shown) formed in the busbar holding member 54 and recessed axially downward. Further, the stator fitting portion may be a projection or a recess formed at the upper end of the stator core 51, the insulator 52, or the like.

As shown in FIG. 1, the coil support member 60 supports a conductive member such as the coil wire C. The coil support member 60 is made of an insulating material. The coil support member 60 is disposed axially above the stator 50, and the coil wire C is inserted therethrough.

Figure 13:
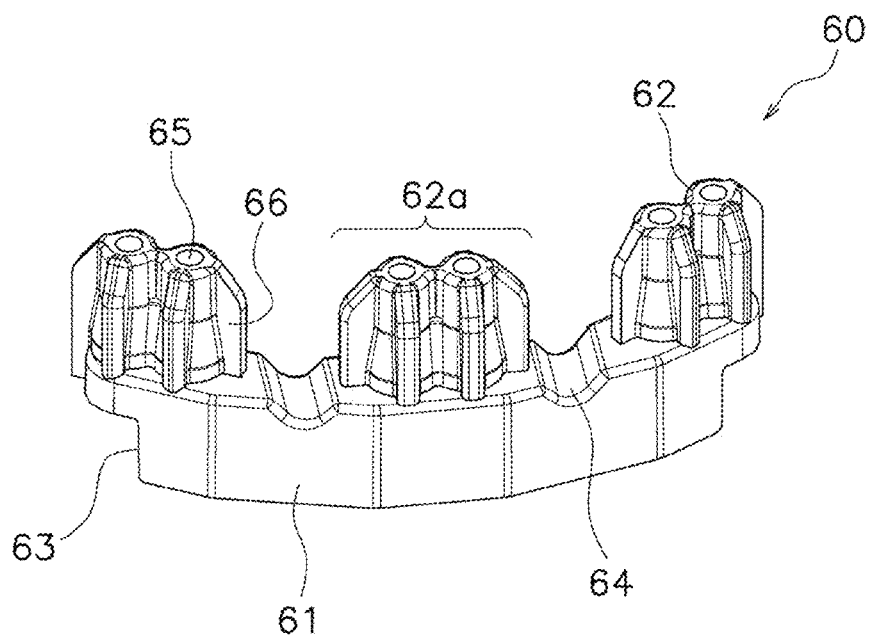
FIG. 13 is a perspective view of a coil support member according to the first example embodiment.

As shown in FIG. 13, the coil support member 60 includes a base portion 61 and a coil support portion 62 extending axially upward from the base portion 61.

Figure 14:
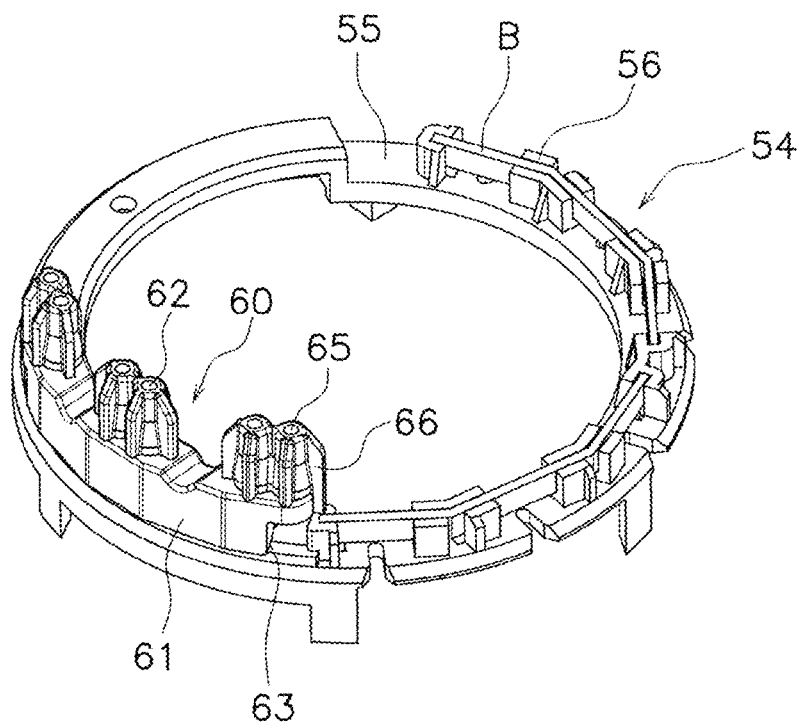
FIG. 14 is a perspective view of the busbar holding member and the coil support member according to the first example embodiment.
Figure 15:
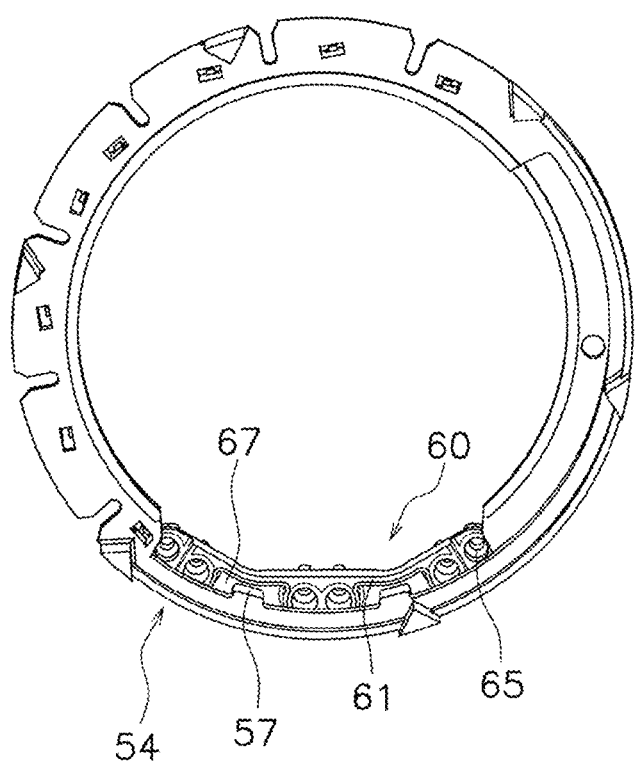
FIG. 15 is a bottom view of the busbar holding member and the coil support member according to the first example embodiment.

The base portion 61 is disposed on the upper face of the stator 50. In the present example embodiment, the stator fitting portion is formed in the busbar holding member 54. Therefore, as shown in FIGS. 14 and 15, the base portion 61 is located on the upper face of the busbar holding member 54. When the stator fitting portion is formed in the stator core 51, the base portion 61 is located on the upper face of the stator core 51, and when the stator fitting portion is formed in the insulator 52, the base portion 61 is located on the upper face of the insulator 52.

As shown in FIGS. 13 and 14, a cut 63 is formed on the axially lower side and at the circumferentially both ends of the base portion 61. The cut 63 is cut out from the lower surface toward the upper side in the axial direction at the circumferentially both ends.

The base portion 61 has a groove 64 formed at the upper end and extending in the radial direction. The groove 64 is located axially above the upper end face of the housing 10.

The radially outer faces of the base portion 61 are formed by a plurality of faces. In the present example embodiment, the number of the radially outer faces of the base portion 61 is five. Note that the radially outer face of the base portion 61 may be a curved surface or the like.

The coil support portion 62 has the through hole 65 through which the coil wire is inserted. The coil wires of the present example embodiment are the six lead wires 53U1, 53U2, 53V1, 53V2, 53W1, and 53W2 constituting the U phase, V phase, and W phase in each of the first and second systems. Since one lead wire is held by one through hole 65, six coil support portions 62 each having the through hole 65 are provided on the base portion 61. In the present example embodiment, the coil support portions 62 through which the coil wires of the same phase are inserted are adjacent to each other without a gap to form a protuberance 62a. That is, the protuberance 62a has a portion that forms the through hole 65 through which a coil wire of the same phase is inserted, and a rib 66 described later. The protuberance 62a exists for each of U-phase, V-phase, and W-phase, and each protuberance 62a is disposed in parallel at intervals.

At least part of the coil support portion 62 is located in the heat sink through hole 110 described later. The width of the coil support portion 62 shown in FIG. 13 is equal to the width of the heat sink through hole 110 from the upper side to the lower side in the axial direction or gradually increases. The upper width of the coil support portion 62 is smaller than the lower width. The coil support portion 62 has a tapered shape toward the upper side.

The coil support portion 62 has the rib 66 extending in a direction crossing the axial direction. In the present example embodiment, the protuberance 62a has ribs extending from the both sides of the protuberance 62a in the circumferential direction, and ribs extending from the both sides of each through hole 65 in the radial direction. Therefore, each protuberance 62a has six ribs 66. The width of the rib 66 is equal to or gradually smaller than the width of the heat sink through hole 110 from the lower side in the axial direction toward the upper side, and the width of the upper end is smaller than the width of the lower end. For this reason, the shape of the coil support portion 62 having the rib 66 of the present example embodiment is tapered axially upward. The protuberance 62a also has a tapered shape axially upward.

As shown in FIG. 15, the base portion 61 is fitted to the stator 50 via a gap. The base portion 61 and the stator 50 may be partially in contact with each other, but are preferably disposed with a gap in a direction perpendicular to the axial direction (including the radial direction and the circumferential direction). In the latter case, the entire coil support member 60 is movable with respect to the stator 50 when the motor 1 is assembled. In the present example embodiment, the base portion 61 and the stator 50 are disposed with a gap therebetween in the circumferential direction.

The base portion 61 has a coil support member fitting portion 67 that is a recess or a projection extending in the axial direction. The stator fitting portion and the coil support member fitting portion 67 are fitted through a gap by the recess and the projection.

The radial width of the recess of the stator fitting portion or the coil support member fitting portion 67 is larger than the radial width of the projection of the coil support member fitting portion 67 or the stator fitting portion. The circumferential width of the recess of the stator fitting portion or the coil support member fitting portion 67 is larger than the circumferential width of the projection of the coil support member fitting portion 67 or the stator fitting portion. Further, it is preferable that the stator fitting portion be a projection, and the coil support member fitting portion 67 be a recess, and they be fitted through a gap in the circumferential direction. In other words, the stator 50 has a projection extending in the axial direction, the base portion 61 has a recess extending in the axial direction, the projection of the stator 50 and the recess of the base portion 61 are fitted to each other with a gap in the circumferential direction, and the circumferential width of the recess of the base portion 61 is larger than the circumferential width of the projection of the stator 50.

In the present example embodiment, the coil support member fitting portion 67 is a recess formed in the base portion 61, and the stator fitting portion is the busbar projection 57 formed on the busbar holding member 54.

As described above, the stator 50 and the coil support member 60 are fitted in a projection-recess shape, whereby the coil support member 60 is positioned at a predetermined position. Further, they are fitted through the gap, so that the position of the coil support member 60 can be adjusted for the width of the gap. As a result, the heat sink 100 can be inserted while adjusting the position of the coil support member 60, which facilitates assembly. Further, the projection-recess relationship may be reversed so as to satisfy the functions described above.

Note that the busbar holding member 54 as part of the stator 50 needs to be fixed because the busbar and the coil lead wire need to be fixed by welding. On the other hand, the coil support member 60 may move as long as the coil lead wire can be positioned.

The coil support member fitting portion 67 is located between the adjacent coil support portions 62 in the base portion 61. In other words, the coil support member fitting portion 67 is located between the adjacent protuberances 62a in the base portion 61. The coil support member fitting portion 67 is located on the axially lower surface of the base portion 61 and extends along the circumferential direction (parallel direction).

The control unit controls a motor main body having the rotor 40 and the stator 50, and as shown in FIG. 1, includes the board 70 and the electronic component 80 mounted on this board 70. The board 70 is disposed axially above the stator 50 so as to spread in the radial direction, and is fixed to the axially upper side of the heat sink 100. The electronic component 80 is mounted on at least one of the upper face and the lower surface of the board 70.

Figure 16:
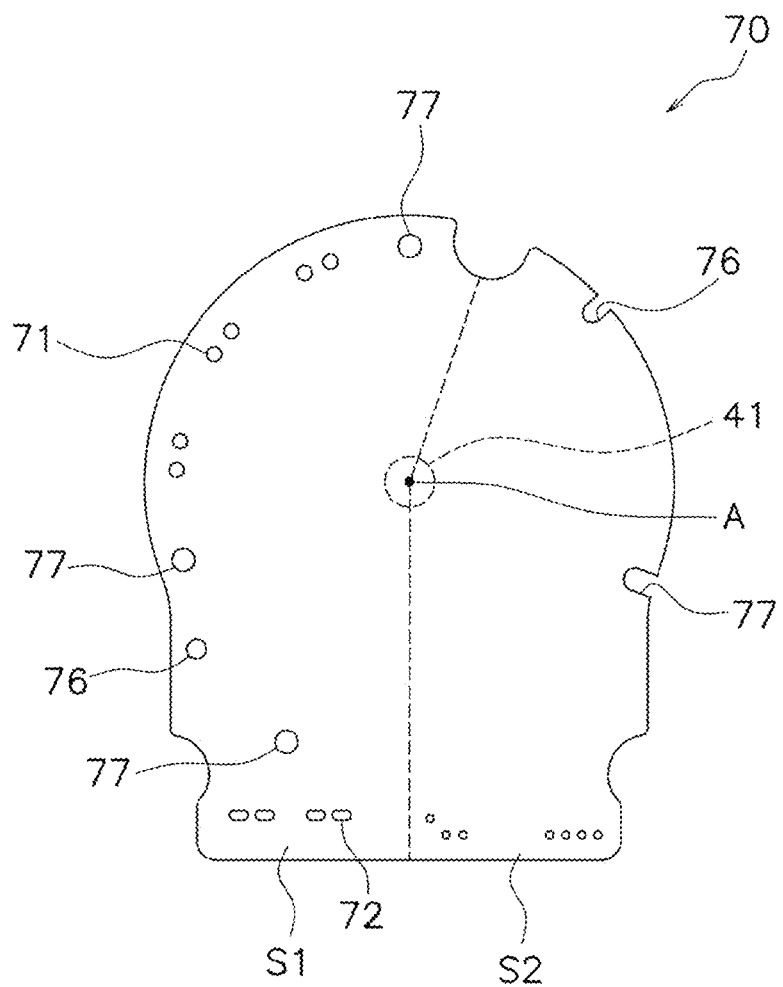
FIG. 16 is a bottom view of a board according to the first example embodiment.

As shown in FIG. 16, the board 70 has a first region S1 in which the power element is mounted and a second region S2 in which the control element is mounted. The first region S1 is a region of 180 degrees or more around the center axis A of the shaft 41 when viewed from the upper side in the axial direction.

Here, when the power element and the control element are separately disposed in the circumferential direction on the board 70, the first region S1 and the second region S2 can be defined. Therefore, this is not the case when the power element and the control element are scattered irregularly on the board 70, and when the power element and the control element are disposed separately in the same circumferential direction and in the same radial direction.

The first region S1 and the second region S2 are regions defined by an angle with the shaft 41 (the center axis A) as the center. For example, even if the power element is unevenly disposed radially inside of the board 70 in the first region S1, the radially outer side of the board 70 is regarded as the first region S1.

Here, the power element is an element, on the circuit, that connects the coil wire to the external power supply, and the control element is an element, on the circuit, that connects a signal line detected by a magnetic sensor to an external control device. Examples of the power element include a choke coil, an FET, and a capacitor. Examples of the control element include a microcomputer and the like.

As shown in FIG. 16, the board 70 has board through holes 71 and 72 through which the conductive member passes. The conductive member is a member that is connected to the board 70 and distributes power, such as a connector pin 81 (see FIG. 1), the coil wire C wound around the stator 50, and the like. In the present example embodiment, the coil wire is inserted into the board through hole 71, and the connector pin 81 is inserted into the board through hole 72. The coil wire C and the board 70, and the connector pin 81 and the board 70 are connected by solder.

Figure 17:
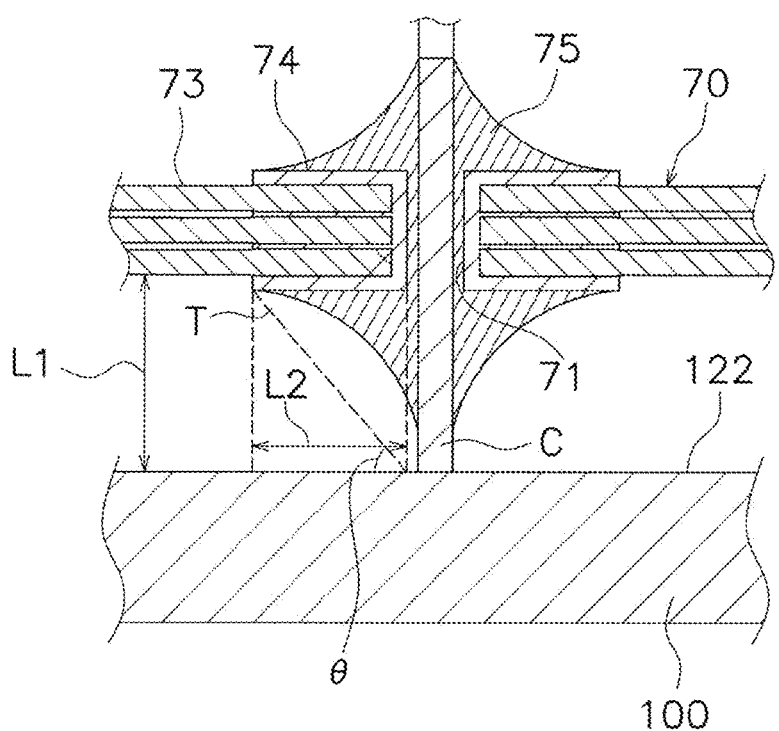
FIG. 17 is a cross-sectional view of the board and a conductive member according to the first example embodiment.

Specifically, as shown in FIG. 17, the board 70 includes a printed board 73 and a land 74 surrounding the board through hole 71 formed in the printed board 73. The land 74 is located on the upper and lower surfaces of the printed board 73 and the inner face of the board through hole 71.

As shown in FIG. 16, the board 70 includes, for positioning with the heat sink 100, a positioning hole portion 76 corresponding to a second positioning recess 176 (see FIG. 18) of the heat sink 100. The positioning hole portion 76 is a round hole, a cutout hole, or the like.

In addition, the board 70 includes, for fixing with the heat sink 100, a fixing hole 77 corresponding to a fixing hole 177 (see FIG. 18) of a heat sink main body 103. The fixing hole 77 is a round hole, a cutout hole, or the like.

A first positioning hole 178 passes through a heat sink upper face 101 and a heat sink lower surface 102. When the heat sink upper face 101 is processed, the second positioning recess 176 is formed using the first positioning hole 178 as a reference. Similarly, when the heat sink lower surface 102 is processed, a first positioning recess 179 is formed using the first positioning hole 178 as a reference. As a result, the positions of the first positioning recess 179 and the second positioning recess 176 are determined based on the first positioning hole 178.

Therefore, the positions of the connector 200 positioned by the first positioning recess 179 and the board 70 positioned by the second positioning recess 176 are determined. Thereby, the connector pin 81 can be easily connected without causing a positional shift between the heat sink 100 and the connector 200.

The board 70 or the electronic component 80 and the conductive member (the board 70 and the coil wire C in FIG. 17) are connected by a connection member 75. The connection member 75 is a conductive adhesive, solder, or the like, and the solder is used in the present example embodiment. The solder is disposed so as to be continuous with the upper and lower surfaces of the board 70 and the inside of the board through hole 71 for allowing the conductive member to pass therethrough. All of the solder is located axially above an exposed face 122 (see FIG. 1) of the heat sink 100 described later.

As shown in FIG. 1, the heat sink 100 is disposed axially above the stator 50 and faces the board 70 in the axial direction.

The heat sink 100 has a function of absorbing heat from the electronic component 80 mounted on the board 70 and releasing it to the outside, and is formed of a material having low thermal resistance.

Since the heat sink 100 holds the bearing 43, it is also used as a bearing holder. In the present example embodiment, since the bearing holder and the heat sink are integrated, the number of parts, the number of assembly points, and the costs associated therewith can be reduced. In addition, since heat resistance generated when the bearing holder and the heat sink are separated can be suppressed, heat can be easily transmitted to the outside.

Figure 18:
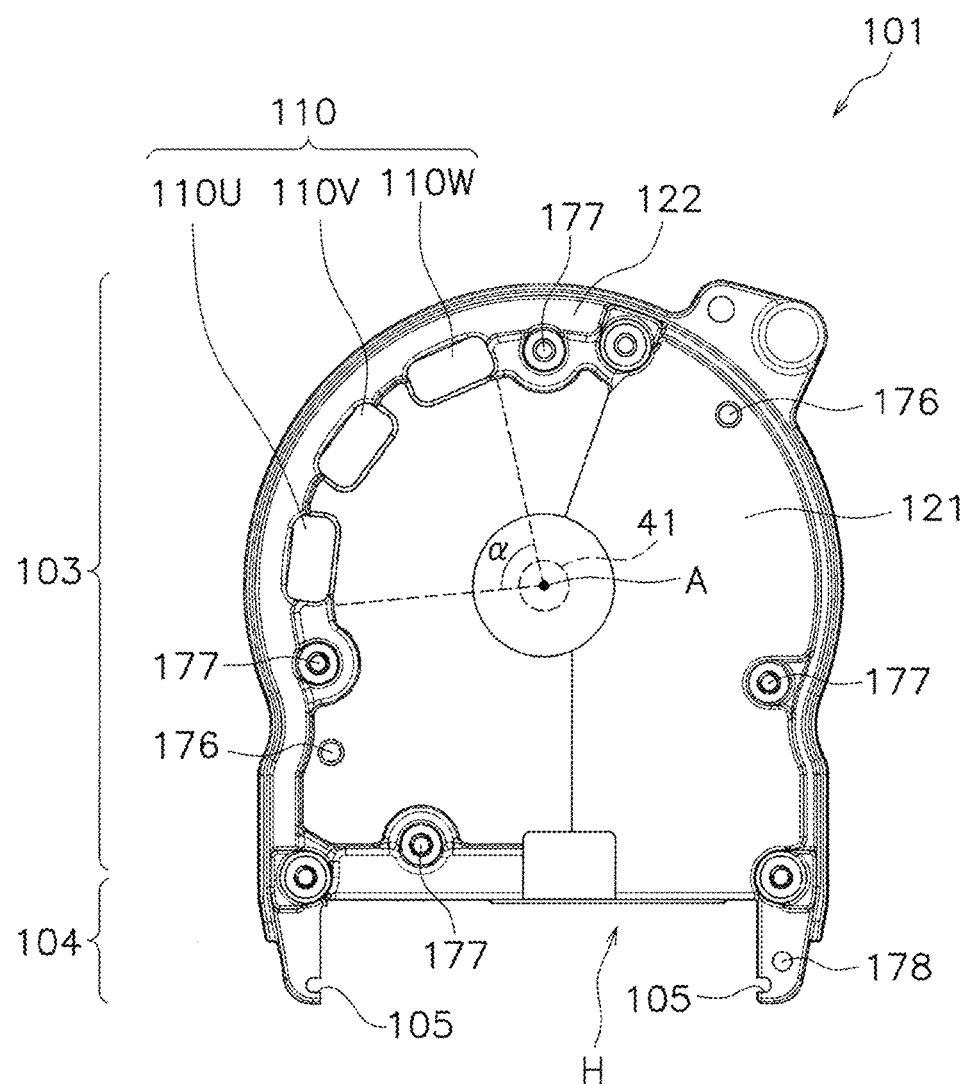
FIG. 18 is a plan view of a heat sink according to the first example embodiment.
Figure 19:
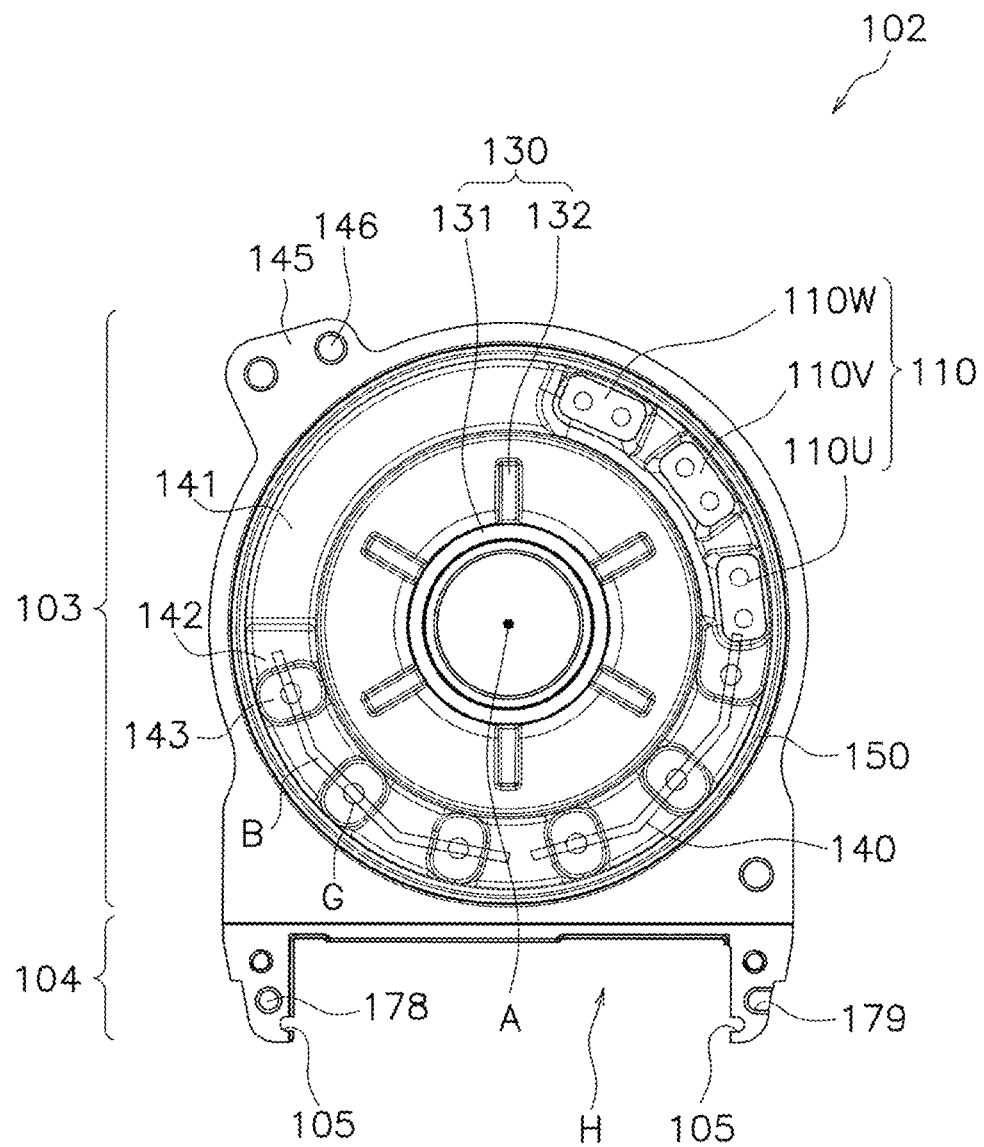
FIG. 19 is a bottom view of the heat sink according to the first example embodiment.

The heat sink 100 has the heat sink upper face 101 shown in FIG. 18 and the heat sink lower surface 102 shown in FIG. 19. The heat sink upper face 101 faces the board 70, and the heat sink lower surface 102 faces the stator 50.

As shown in FIGS. 18 and 19, the heat sink 100 includes the heat sink main body 103 and a heat sink protrusion 104 continuous with the heat sink main body 103 and extending radially outward of the housing 10.

The heat sink main body 103 overlaps the housing 10 that accommodates the rotor 40 and the stator 50 when viewed from the upper side in the axial direction. The heat sink protrusion 104 protrudes from the heat sink main body 103 in the radial direction, and covers at least part of the connector 200 in the longitudinal direction (the left-right direction in FIGS. 18 and 19).

A plurality of heat sink protrusions 104 shown in FIGS. 18 and 19 are formed at intervals. Specifically, the heat sink protrusion 104 protrudes from one end and the other end (the upper end and the lower end in (A) of FIG. 20) of the radially outer end edge (the right end of the heat sink main body 103 in (A) of FIG. 20) of the heat sink main body 103 on the connector 200 side.

Figure 20:
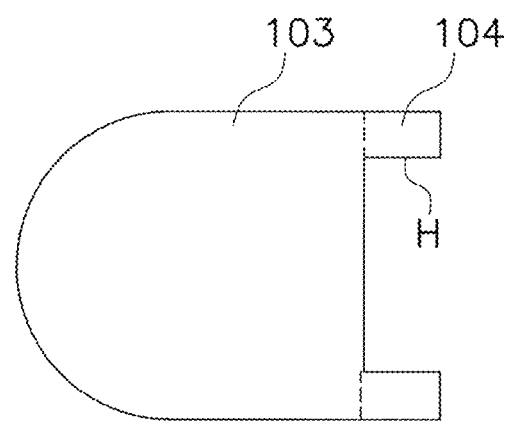
FIG. 20 includes: (A) a plan view schematically showing FIG. 18, and modifications (B) and (C) of (A).
Figure 20:
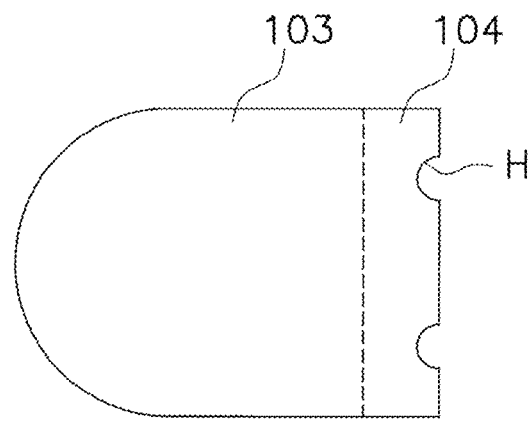
Figure 20:
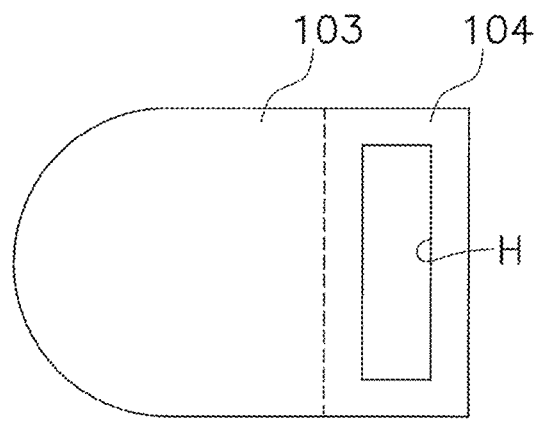

Here, the shape of the heat sink protrusion 104 is a shape protruding in a rod shape in plan view as shown in (A) OF FIG. 20, and when installed only at both ends, the heat sink protrusion 104 together with the heat sink main body 103 forms a substantially U shape. Further, the shape of the heat sink protrusion 104 may be a plate-like shape as shown in (B) OF FIG. 20, a ring shape as shown in (C) OF FIG. 20, or the like. In addition, when the heat sink protrusion 104 has a shape protruding in a rod shape in plan view, one heat sink protrusion 104 may be provided, three or more heat sink protrusions 104 may be provided, or it does not need to be provided at both ends.

The heat sink protrusion 104 has a heat sink recess or a heat sink projection extending in the axial direction so as to be fitted to the connector 200 described later. Further, the heat sink recess or the heat sink projection extends along the axial direction. In FIGS. 18 and 19, a heat sink recess 105 is formed on each of the inner faces of the heat sink protrusion 104 located at one end and the other end of the connector 200 in the longitudinal direction. The inner face of the heat sink protrusion 104 is a face facing the connector 200.

In the present example embodiment, the heat sink protrusion 104 is the exposed face 122 (see FIG. 1). That is, a clearance is provided between the heat sink protrusion 104 and the board 70. Therefore, it is possible to visually check whether the connector pin 81 is connected to the board 70 from the longitudinal direction of the connector 200 in the previous process of attaching the cover 30.

The heat sink 100 has a hollow portion H through which the conductive member passes and that extends in the axial direction. The hollow portion H is a through hole, a cutout or the like.

When the conductive member is the connector pin 81 or the like, in the structure shown in FIGS. 18 and 19, and (A) OF FIG. 20 schematically showing these, the hollow portion H through which the conductive member passes has the heat sink main body 103 and the two heat sink protrusions 104. Specifically, the hollow portion H is formed by a radially outer end edge of the heat sink main body 103 on the connector side and the two heat sink protrusions 104.

In the structure having a cutout at the radially outer end of the heat sink protrusion 104 shown in (B) OF FIG. 20 of the modification, the cutout forms the hollow portion H. In the structure in which the heat sink protrusion 104 shown in (C) OF FIG. 20 of another modification has a ring shape, a hollow hole having a ring shape forms the hollow portion H.

When the conductive member is a coil wire from the stator 50, as shown in FIGS. 18 and 19, the heat sink through hole 110 through which the coil wire passes and that extends in the axial direction is formed as the hollow portion H.

In this way, the hollow portion H of the heat sink 100 shown in FIGS. 18 and 19 includes a hollow portion, for the conductive member from the connector, formed by the radially outer end face of the heat sink main body 103 and the inner end faces of the two heat sink protrusions 104, and the heat sink through hole 110 for the coil wire.

Figure 21:
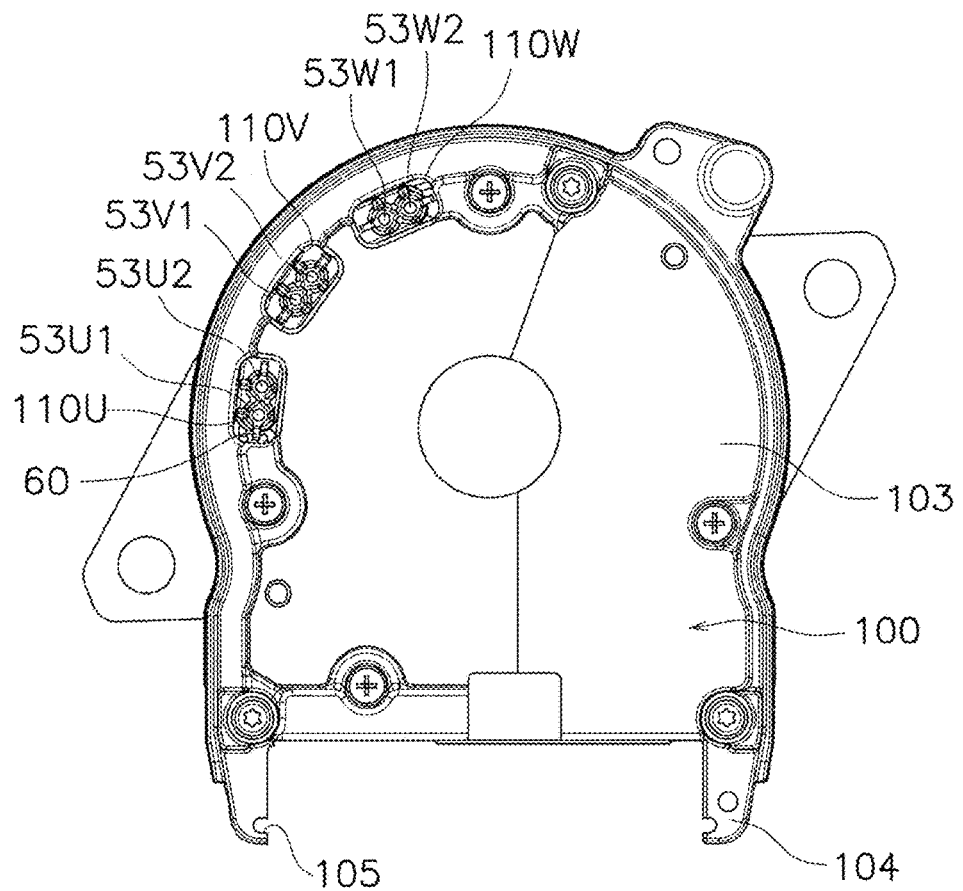
FIG. 21 is a plan view of the coil support member and the heat sink that support a coil wire according to the first example embodiment.

As shown in FIGS. 18, 19, and 21, the heat sink through hole 110, through which a conductive member such as a coil wire passes, extends in the axial direction. For this reason, the heat sink through hole 110 can position the conductive member. As shown in FIGS. 1 and 21, the heat sink through hole 110 of the present example embodiment holds the coil support member 60 that supports the coil wire.

A plurality of heat sink through holes 110 are located adjacent to each other in the circumferential direction. Specifically, a plurality of heat sink through holes 110U, 110V, and 110W are provided at intervals in the circumferential direction. That is, the plurality of heat sink through holes 110U, 110V, and 110W are aligned on a concentric arc at intervals.

As shown in FIG. 18, when the heat sink through holes 110U, 110V, and 110W are located in a region within 180 degrees with the central angle a centering on the shaft 41 (the center axis A) when viewed from the upper side in the axial direction. That is, the heat sink through holes 110U, 110V, and 110W are collected and disposed on one side. It is preferable that the number of slots be 6 or more, the number of phases is 3, and the central angle a be "(360 degrees/the number of slots)×3" degrees or less.

The "phase" in the above formula is the number of independent coils of the fixed stator, and a three-phase motor with three phases is a motor with three independent coils at intervals of 120 degrees. In the present example embodiment, it is a three-phase motor of U-phase, V-phase and W-phase. In addition, the "slot" in the above formula represents the number of grooves between teeth, which is a multiple of 3 for the three-phase motor. In the present example embodiment, since the motor has 12 slots of 3 phases, the central angle a is preferably 90 degrees or less.

Similarly to the heat sink through holes 110U, 110V, and 110W, the coil lead wires 53U1, 53U2, 53V1, 53V2, 53W1, and 53W2 are desirably disposed so as to be located within the central angle a. By using the crossover portion C1, the coil lead wire can be located within the central angle a.

As shown in FIG. 21, only a plurality of in-phase coil wires of the coil wires are inserted into each of the plurality of heat sink through holes 110U, 110V, and 110W. That is, one protuberance 62a of the coil support member 60 is held in each of the heat sink through holes 110U, 110V, and 110W. The plurality of heat sink through holes 110U, 110V, and 110W are holes separated from each other for each phase of the coil wire. That is, the plurality of heat sink through holes 110U, 110V, and 110W are independent from each other and are not connected. Specifically, only the lead wires 53U1 and 53U2, which are two U-phase coils, are inserted into the heat sink through hole 110U. Only the lead wires 53V1 and 53V2, which are two V-phase coils, are inserted into the heat sink through hole 110V. Only the lead wires 53W1 and 53W2, which are two W-phase coils, are inserted into the heat sink through hole 110W.

When viewed from the upper side in the axial direction, the heat sink through holes 110U, 110V, and 110W face the first region S1 in which the power element is mounted on the board 70. For this reason, the heat sink through holes 110U, 110V, and 110W through which the coil wires pass are formed in the first region S1 where the power element of the board 70 is mounted.

When viewed from the upper side in the axial direction, the heat sink through holes 110U, 110V, and 110W may have a structure extending over the first region S1 where the power element is mounted and the second region S2 where the control element is mounted. Further, when viewed from the upper side in the axial direction, a structure in which part of the heat sink through hole is the first region S1 and the remaining part is the second region S2 may be provided.

Figure 22:
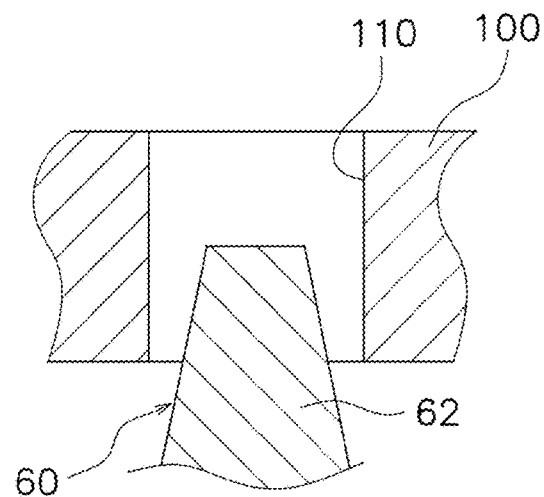
FIG. 22 is a cross-sectional view of a heat sink through hole and the coil support member according to the first example embodiment.
Figure 23:
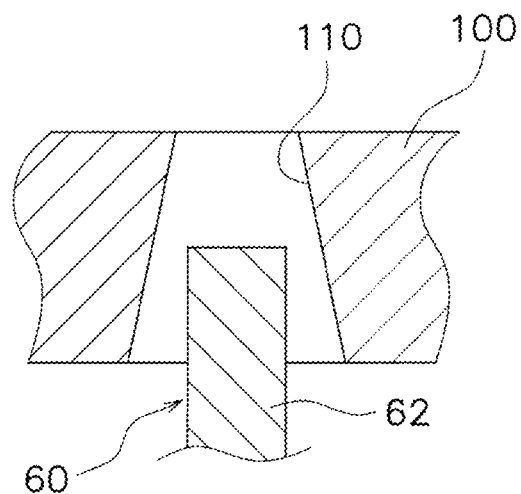
FIG. 23 shows a modification of FIG. 22.

As shown in FIG. 1, at least part of the coil support portion 62 is located in the heat sink through hole 110. As shown in FIGS. 1, 22, and 23, the clearance between the coil support portion 62 and the heat sink through hole 110 is smaller or constant as it goes downward.

Specifically, as shown in FIG. 22, the width of the upper end of the coil support portion 62 is smaller than the width of the lower end of the heat sink through hole 110, and the width of the coil support portion 62 is constant or gradually larger as it goes from the upper side toward the lower side in the axial direction. More specifically, the heat sink through hole 110 has a constant width, and the side face of the coil support portion 62 has a tapered shape that expands downward.

In addition, as shown in FIG. 23, the width of the lower end of the heat sink through hole 110 is larger than the width of the upper end of the coil support portion 62, and the width of the heat sink through hole 110 is constant or gradually smaller as it goes from the lower side toward the upper side in the axial direction. More specifically, the heat sink through hole 110 has a tapered shape that expands downward, and the side face of the coil support portion 62 has a constant width.

In FIGS. 22 and 23, although the width of the upper end of the heat sink through hole 110 is larger than the width of the coil support portion 62, the width of the upper end of the heat sink through hole 110 may be smaller than the width of the coil support portion 62.

In this way, since the clearance between the coil support portion 62 and the heat sink through hole 110 is constant or larger as it goes from the lower side to the upper side, when the motor is assembled, the heat sink through hole 110 can be easily inserted from above the coil support member 60.

Figure 24:
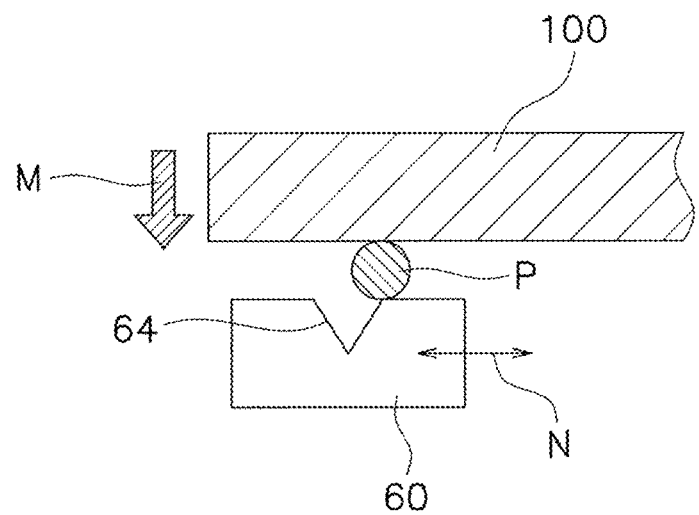
FIG. 24 is a schematic diagram of a process of inserting the heat sink into the coil support member from above in the first example embodiment.

Further, the groove 64 (see FIG. 13) of the coil support member 60 allows easy positioning when the heat sink 100 is inserted from above the coil support member 60. The reason is as follows. As shown in FIG. 24, with a pin P inserted in the radial direction in the vicinity of the groove 64 on the upper end face of the base portion 61, when the heat sink 100 is inserted into the coil support member 60 from the upper side in the axial direction as indicated by arrow M, the heat sink 100 presses the pin P, so that the pin P moves to the groove 64. Since the coil support member 60 moves in accordance with arrow N in response to the pressing of the pin P, the heat sink 100 and the coil support member 60 can be positioned. The coil support portion 62 is inserted into the heat sink through hole 110, and the position is determined. Since the groove 64 is located axially above the upper end face of the housing 10, the inserted pin P can be easily removed.

As shown in FIG. 1, the heat sink 100 has a contact face 121 and the exposed face 122. The contact face 121 and the exposed face 122 are faces located on the upper face of the heat sink 100 shown in FIG. 18.

The contact face 121 comes into contact with the board or the electronic component 80 directly or through a heat dissipation member 123. The heat dissipation member 123 is a member having the heat dissipation performance such as grease. The heat dissipation member 123 comes into contact with the heat sink 100 and the board 70. The exposed face 122 is exposed without coming into contact with the board 70, the electronic component 80, and the heat dissipation member. In other words, the exposed face 122 is disposed with a clearance from the board 70 or the electronic component 80. That is, the contact face 121 comes into direct or indirect contact with the board 70 or the electronic component 80, and the exposed face 122 comes into direct or indirect contact with no member.

As shown in FIG. 18, the exposed face 122 is located edge side with respect to the hollow portion H (the heat sink through hole 110 in FIG. 18). In the present example embodiment, since the plurality of heat sink through holes 110 are provided along the circumferential direction, the exposed face 122 is located radially outside of the heat sink through holes 110. The boundary between the contact face 121 and the exposed face 122 is located in the circumferential direction. In FIG. 18, the boundary between the contact face 121 and the exposed face 122 is located on a circular arc with a central angle a obtained by connecting the heat sink through hole 110U located at one end, the heat sink through hole 110W located at the other end, and the center axis A.

Since a clearance is formed between the board 70 and the electronic component 80, and the heat sink 100 by the exposed face 122, the connection of the board 70 or the electronic component 80 and the conductive member can be visually checked. When the connection is checked from the upper face of the board 70, since the connection, by the connection member, of the inside of the board through hole 71 and the lower surface of the board 70 is unknown, it is preferable to check the connection from the lower surface side of the board 70.

Figure 25:
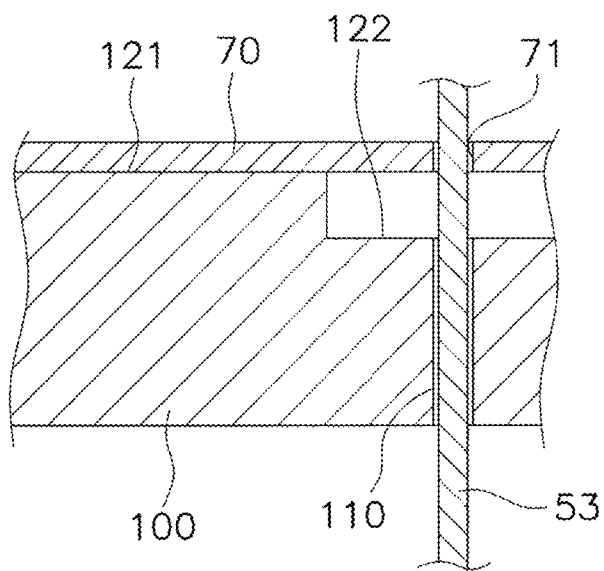
FIG. 25 includes: (A) a schematic diagram of the heat sink and the board, and (B) a modification of (A).
Figure 25:
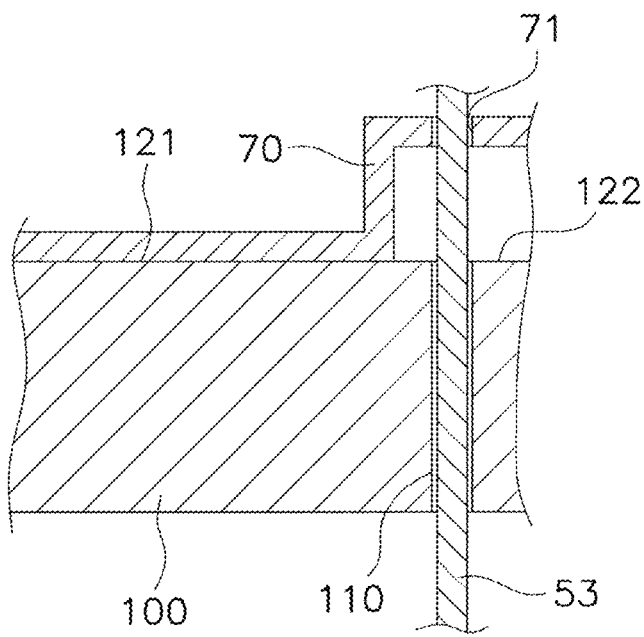

In the heat sink 100 shown in FIG. 1, the exposed face 122 is located axially below the contact face 121. FIG. 25 schematically shows the relationship between the vicinity of the boundary between the exposed face 122 and the contact face 121, and the board 70. As shown in (A) OF FIG. 25, the board 70 may have a plate shape that extends flatly, and the exposed face 122 may be located below the contact face 121. Further, as shown in (B) OF FIG. 25, the board 70 may have a step structure, and the exposed face 122 and the contact face 121 may be located on the same plane.

The contact face 121 may have a first contact face that comes into direct contact with the board 70 or the electronic component 80, and a second contact face that comes into contact with the board 70 or the electronic component 80 via the heat dissipation member 123.

In order to check the shape of the lower end (back fillet) of the connection member that connects the electronic component 80 or the board 70 and the conductive member, it is preferable that the clearance between the board 70 or the electronic component 80 and the exposed face 122 be larger than the clearance between the board 70 or the electronic component 80 and the second contact face. In addition, the clearance is thin due to the grease applied to the second contact face, and the connection member is disposed into the exposed face 122, so that it is difficult to see. From the viewpoint of suppressing such a problem, it is preferable to increase the clearance between the board 70 or the electronic component 80 and the exposed face 122. In addition, when the coil support member 60 is displaced upward, it is difficult to see the lower end of the connection member, so that it is preferable to have a sufficient clearance.

For the size of such a clearance, for example, as shown in FIG. 17, a dimension L1 between the exposed face 122 of the heat sink 100 and the lower surface of the board 70 (or electronic component) is larger than a dimension L2 from the board through hole 71 to the outer end of the land 74.

Further, an angle θ formed by an imaginary line T connecting the outer end of the land 74, and the intersection position of the coil wire C and the exposed face 122, and the exposed face 122 is preferably 45 degrees or more.

As shown in FIG. 1, when the distal end of the member that supports the conductive member (the coil support member 60 in the present example embodiment) is located at a height the same as or below a height of the exposed face in the axial direction, the lower end of the connection member can be checked more easily. On the other hand, when the distal end of the member that supports the conductive member is located at a height the same as or above a height of the exposed face 122 in the axial direction, it is possible to further prevent the connection member connecting the board 70 or the electronic component 80 and the conductive member from being conducted to the heat sink 100.

As shown in FIG. 1, the heat sink 100 includes an inner region 130, an outer region 140 located radially outside of the inner region 130, and an outer wall portion 150 formed radially outside of the outer region 140.

The inner region 130 at least partially overlaps the electronic component 80 in the axial direction. The axial thickness of the inner region 130 is larger than the axial thickness of the outer region 140.

In the present example embodiment, since the heat sink through holes 110U, 110V, and 110W are located in the radially outer region of the board 70, the board 70 is densely populated with the electronic components in the radially inner region thereof. Therefore, the heat of the electronic components can be released to the heat sink 100 by increasing the axial thickness of the inner region 130 of the heat sink 100. Furthermore, a space for accommodating the components can be secured by reducing the thickness of the outer region 140. Therefore, it is possible to more effectively dissipate heat from the electronic component and to suppress the axial dimensions.

As shown in FIG. 19, the inner region 130 has an inner wall portion 131 and a rib 132. The inner wall portion 131 and the rib 132 are formed on the heat sink lower surface 102. The inner wall portion 131 extends axially downward at the radially inner end. The rib 132 extends radially outward from the inner wall portion 131. A plurality of ribs 132 are provided, and each of the plurality of ribs 132 is disposed at equal intervals in the circumferential direction. The plurality of ribs 132 extend radially in the radial direction with the center axis A as the center. Since the inner wall portion 131 and the rib 132 can increase the rigidity of the inner region 130 of the heat sink 100, the durability against the stress for supporting the shaft 41 can be improved when the heat sink 100 holds the bearing 43. Further, by extending the rib 132 in the radial direction, the heat capacity of the heat sink 100 can be increased and heat can be easily transferred radially outward.

The outer region 140 has the heat sink through holes 110U, 110V, and 110W through which the coil wire C described above is inserted. The lower surface of the outer region 140 is located axially above the lower surface of the inner region 130.

As shown in FIG. 1, the busbar holding member 54 is located below the outer region 140 in the axial direction and overlaps the inner region 130 in the radial direction. In other words, a recess that is recessed in the axially upward is provided on the radially outer side and the lower surface of the heat sink 100, and the busbar B is accommodated in this recess.

In the present example embodiment, a large number of heat generating elements (elements having a relatively large amount of heat generation, such as FETs) are disposed in the center portion (radially inside) of the board 70. For this reason, the heat dissipation effect is enhanced by increasing the thickness of the inner region 130 located at the center of the heat sink 100 facing the board 70.

On the other hand, the coil wire C drawn from the coil 53 of the stator 50 is connected to the outer side (radially outer side) of the board 70, and no heat generating element is disposed. By disposing the busbar holding member 54 while reducing the thickness of the outer region 140, the height in the axial direction can be suppressed. Further, the heat sink 100 covers the upper face and the side face of the busbar, so that the heat sink 100 can absorb the radiant heat of the busbar during driving.

The outer wall portion 150 surrounds the radially outer side of the busbar holding member 54. The axial thickness of the outer wall portion 150 is larger than the axial thickness of the inner region 130. At least part of the outer wall portion 150 is exposed to the outside. Since the outer wall portion 150 includes a portion having the largest axial thickness in the heat sink 100, the heat dissipation effect can be further enhanced.

As shown in FIG. 19, the heat sink 100 has a first portion 141 and the second portion 142. The second portion 142 is located on a circumference identical to the first portion 141 and extends along the circumferential direction. In the present example embodiment, the first portion 141 and the second portion 142 are located in the outer region 140. The first portion 141 and the second portion 142 have a substantially C shape extending along the circumferential direction. The first portion 141 and the second portion 142 are adjacent to each other. For this reason, the first portion 141 and the second portion 142 form a ring. Note that the first portion 141 and the second portion 142 may not be adjacent to each other, and another portion may be interposed between the first portion 141 and the second portion 142. Even in this case, the first portion 141 and the second portion 142 are located in a concentric arc shape. Further, as long as the first portion 141 and the second portion 142 overlaps at least partially in the concentric circle, the radial widths of the first portion 141 and the second portion 142 may be different.

The axial thickness of the first portion 141 is larger than the axial thickness of the second portion 142. The lower surface of the second portion 142 is located axially above the lower surface of the first portion 141. The busbar B is located axially below the second portion 142. The heat sink 100 can have a large volume by the first portion 141 having a large thickness on the same circumference (concentric arc). The second portion 142 having a small thickness provides a space for positioning the busbar B below.

The first portion 141 overlaps at least part of the electronic component 80 in the axial direction. Since the first portion 141 having a relatively large thickness can have a large volume, the heat capacity can be increased. Therefore, heat generated from the electronic component 80 can be effectively released.

The ends of the coil wire C drawn from the coil 53 (the output wire end 53X and the ground wire end G) are not located axially below the first portion 141. The crossover portion C1 is located axially below the first portion 141. That is, at least one of the crossover portions C1 shown in FIG. 10 connects the coil 53 that is located at a position overlapping the first portion 141 when viewed in the axial direction, the output wire end or a ground wire end (the output wire end 53X in FIG. 19) located at a position overlapping the second portion 142 when viewed in the axial direction. In this way, the coil wire C drawn from the slot located below the first portion 141 can be collected at a position overlapping the second portion 142 by the crossover portion C1.

As described above, in the present example embodiment shown in FIG. 10, the number of slots through which the coil wire is drawn can be reduced by three by the crossover portion C1. For this reason, when the coil wire has the crossover portion C1, the circumferential length of the second portion 142 can be shortened for three slots. In other words, the circumferential length of the first portion 141 can be increased for three slots. As a result, since the volume of the first portion 141 that is a relatively thick portion in the outer region 140 can be increased, the volume of the heat sink 100 increases, and the heat capacity of the heat sink 100 can be increased.

The second portion 142 has a recess 143 that is recessed axially upward. The recess 143 is formed on the heat sink lower surface 102. The connection portion between the busbar B and the coil wire C (the ground wire end G in FIG. 19) is located below the recess 143 in the axial direction. In the present example embodiment, the number of connection portions between the busbar B and the coil wire C is six, and six recesses 143 spaced apart from each other are provided.

The second portion 142 has the heat sink through hole 110 through which the coil wire is inserted. The heat sink through hole 110 may be formed in the recess 143.

The heat sink 100 further includes a fixing portion 145 provided radially outside of the first portion 141. The fixing portion 145 has a fastening through hole 146 for fastening the heat sink 100 and the housing 10 using a fastening member such as a screw.

As shown in FIG. 18, the heat sink upper face 101 of the heat sink main body 103 has the second positioning recess 176 for positioning with the board 70. A plurality of second positioning recesses 176 are formed as circular recesses. A positioning member such as a positioning pin is inserted into the second positioning recess 176 of the heat sink 100 and the positioning hole portion 76 (see FIG. 16) of the board 70 for positioning.

The heat sink main body 103 has the fixing hole 177 for fixing of the board 70. The fixing hole 177 is a board contact portion that contacts the board 70 in the axial direction. A plurality of fixing holes 177 are formed as circular holes. A fixing member such as a fixing pin or a screw is inserted into the fixing hole 177 of the heat sink 100 and the fixing hole 77 of the board (see FIG. 16), and the board 70 and the heat sink 100 are fixed.

As described above, the positions of the heat sink 100 and the board 70 are determined using the positioning member, and are fixed by the fixing member. After the board 70 and the heat sink 100 are fixed, the positioning member is removed.

Since the heat sink 100 and the board 70 are brought into contact with each other, the fixing hole 177 protrudes axially upward with respect to the exposed face 122. That is, in the present example embodiment, the fixing hole 177 is located on the first contact face.

As shown in FIG. 18, the plurality of heat sink through holes 110 and the fixing holes 177 are provided at intervals in the circumferential direction. The two fixing holes 177 are provided at intervals in the circumferential direction with respect to the heat sink through holes 110U and 110W located at both ends in the circumferential direction among the plurality of heat sink through holes 110.

As shown in FIG. 19, the heat sink protrusion 104 has the first positioning hole 178, and the first positioning recess 179 or a first positioning projection (not shown) for positioning with the connector 200. The first positioning recess is a cutout recess.

As shown in FIG. 1, the connector 200 is disposed adjacent to the housing 10 and electrically connects the board 70 and the outside of the motor 1. The connector 200 of the present example embodiment is disposed radially outside of the housing 10, extends axially downward (in the downward direction), and accommodates the connector pin 81 that is a conductive member and that extends axially downward from the board 70 therein.

The upper face of the connector 200 is located below the heat sink upper face 101 of the heat sink 100, and the connector 200 and the board 70 overlap when viewed from the upper side in the axial direction.

Figure 26:
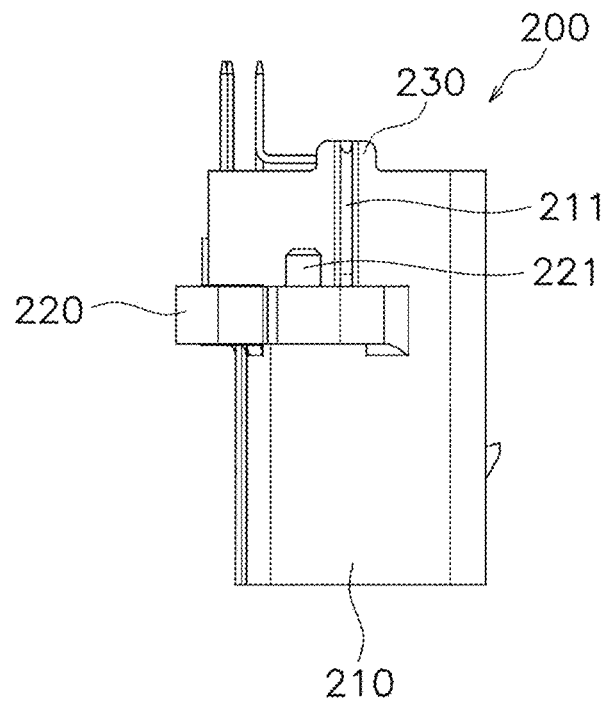
FIG. 26 is a side view of a connector according to the first example embodiment.
Figure 27:
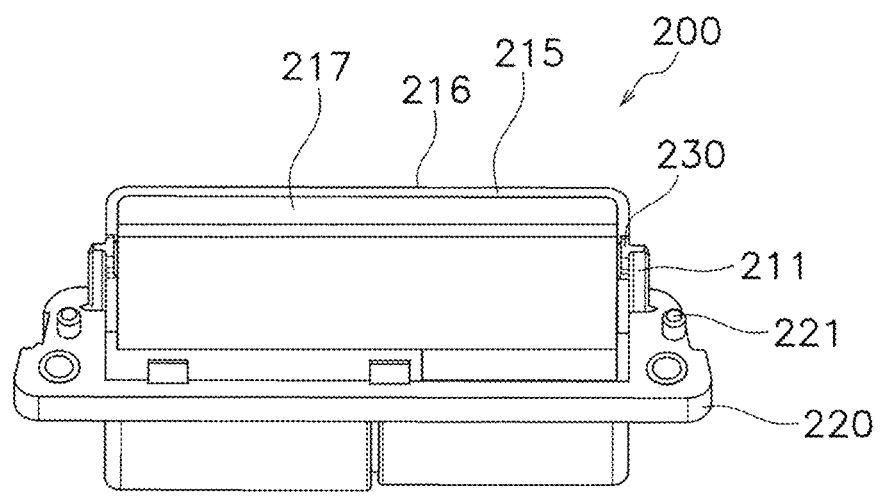
FIG. 27 is a perspective view of the connector according to the first example embodiment.

As shown in FIGS. 26 and 27, the connector 200 includes a connector body 210 extending in the axial direction, a connector flange portion 220 extending radially outward from the outer face of the connector body 210, and a connector protrusion 230 extending axially upward from the upper face of the connector body 210.

Figure 28:
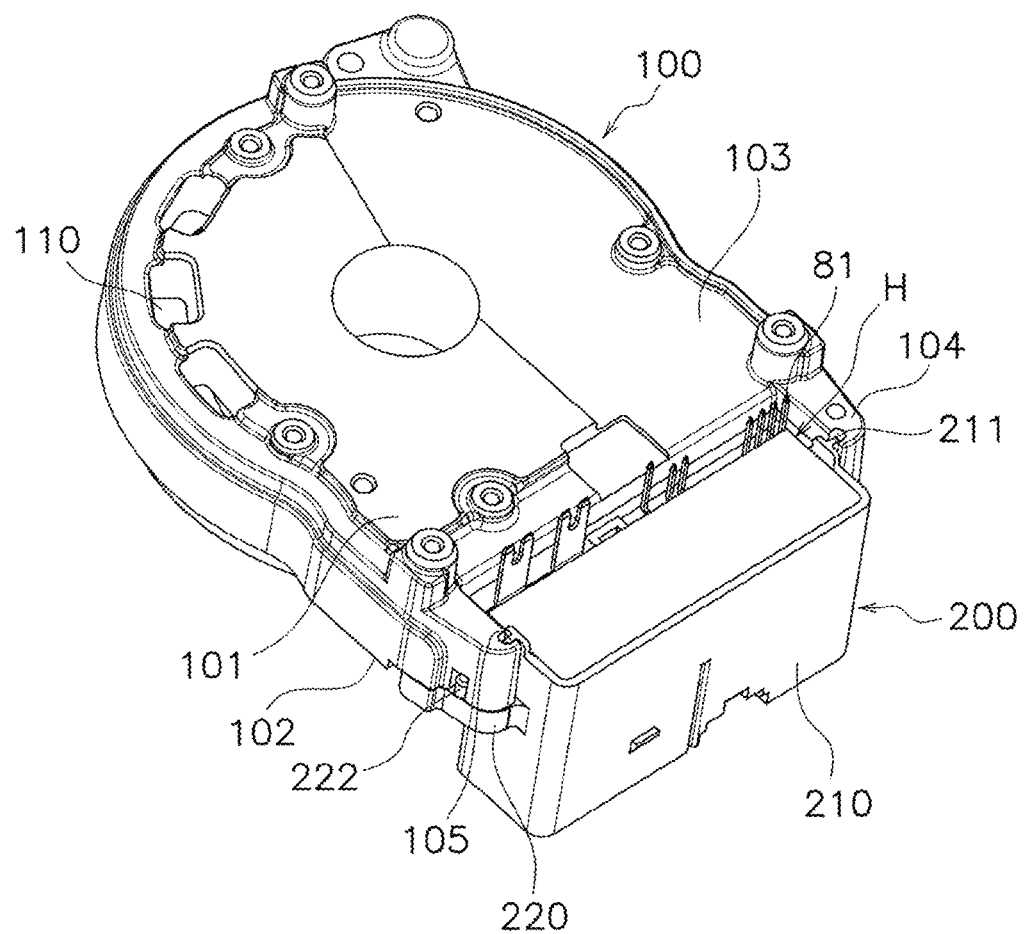
FIG. 28 is a perspective view of the heat sink and the connector according to the first example embodiment.
Figure 29:
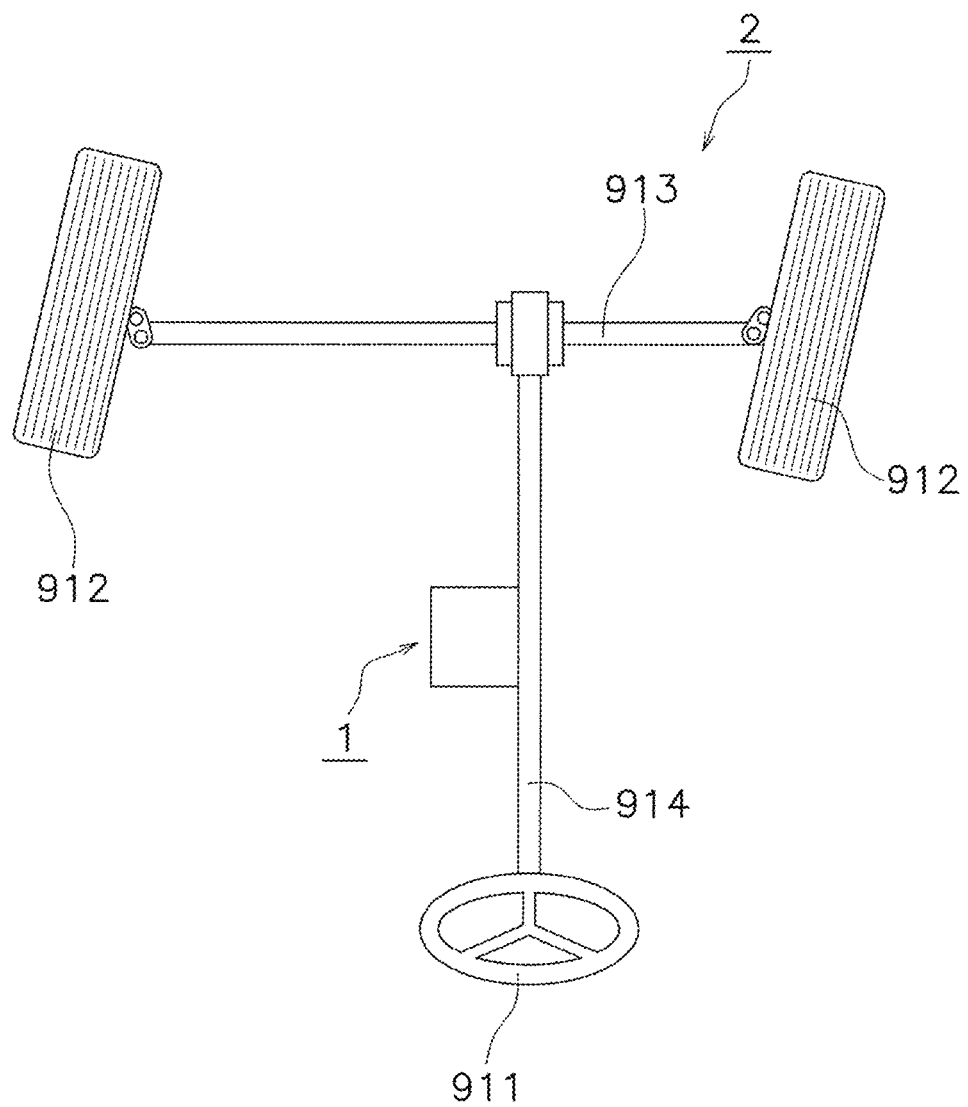
FIG. 29 is a schematic diagram of an electric power steering device according to a second example embodiment.

As shown in FIG. 28, when the hollow portion H is formed with the heat sink main body 103 and the two heat sink protrusions 104, at least part of the connector body 210 is located in the hollow portion H.

The connector body 210 is formed on the outer face and has a body projection 211 extending in the axial direction or a body recess (not shown). The body projection 211 extends in the axial direction from the connector flange portion 220 to the connector protrusion 230.

As shown in FIGS. 6, 27, etc., the connector body 210 further includes a connector projection 215 formed in the radially outer end region and extending in the axial direction. The connector projection 215 is an outer edge portion including the connector outer end edge 216 on the radially outer side. The "connector outer end edge 216" is the outer end (the end of the connector 200).

The connector body 210 further has, radially inside of the connector projection 215, a pocket recess 217 formed by the radially inner face of the connector projection 215. The pocket recess 217 stores dust coming from the outside.

The connector flange portion 220 is formed in the central portion of the connector body 210 in the axial direction. The central portion is within a predetermined range from the center (for example, within one third of the center of the axial height). Thereby, even if the connector 200 receives an external force, durability can be improved.

As shown in FIGS. 26 and 27, a fitting portion 221 for positioning with the heat sink 100 is formed on the upper face of the connector flange portion 220. The fitting portion 221 is fitted into each of the first positioning hole 178 and the first positioning recess 179 or the first positioning projection (not shown). The fitting portion 221 of the present example embodiment is a protuberance that extends upward.

The connector protrusion 230 extends upward from the upper face of the connector body 210. The connector protrusion 230 may be integrally formed with the connector body 210 or may be a separate member.

As shown in FIG. 6, the connector projection 215 and the cover recess 33 are fitted via a gap. The connector 200 is substantially rectangular in plan view. The connector projection 215 and the cover recess 33 extend along the longitudinal direction of the connector 200.

Further, as shown in FIG. 1, the connector protrusion 230 and the cover step 35 are fitted via a gap. A corner portion on the radially outer side of the connector protrusion 230 and the step of the cover step 35 are fitted to face each other.

The fitting between the cover 30 and the connector 200 in the outer end region R in the present example embodiment has been described by the structure shown in FIG. 6 as an example, but the fitting may be the structure shown in FIGS. 7 to 9.

In the structure shown in FIG. 7, the connector projection 215 is not configured by the connector outer end edge 216, but extends axially upward from a position spaced from the connector outer end edge 216 in the radial direction. The fitting between the connector projection 215 and the cover recess 33 through the gap is located in the outer end region R not including the cover outer end edge 31 and the connector outer end edge 216.

In the structure shown in FIG. 8, the connector 200 further includes a step 218 that extends radially inward from the upper end of the radially inner face of the pocket recess 217. The connector projection 215 and the cover recess 33 are fitted through a gap, and a recess 219 including the pocket recess 217 and the step 218, and the cover projection 34 is fitted through a gap.

In the structure shown in FIG. 9, the connector 200 has, radially outside of the connector projection 215, the pocket recess 217 formed by the radially outer face of the connector projection 215. Part of the cover recess 33 faces the pocket recess 217, and the remaining part of the cover recess 33 is fitted to the connector projection 215 via a gap. The fitting between the connector projection 215 and the cover recess 33 through the gap is located in the outer end region R not including the cover outer end edge 31 and the connector outer end edge 216.

As described above, the motor 1 according to the present example embodiment has a labyrinth structure in which the cover 30 and the connector 200 are fitted to each other in a projection-recess shape through the gap. For this reason, while having a dustproof effect, a motor can be assembled easily.

As shown in FIG. 28, the connector 200 contacts the lower surface of the heat sink protrusion 104. Specifically, the heat sink protrusion 104 is disposed on the connector flange portion 220 such that a flange upper face 222 of the connector flange portion 220 and the heat sink lower surface 102 of the heat sink protrusion 104 contact each other. As shown in FIG. 18, when a plurality of heat sink protrusions 104 are formed at intervals, the connector flange portion 220 contacts each of the lower surfaces of the plurality of heat sink protrusions 104.

The connector flange portion 220 may include a member such as a metal collar. When the connector flange portion 220 includes a metal collar, the metal collar located at the upper end of the connector flange portion 220 contacts the lower surface of the heat sink protrusion 104. The metal collar has a collar tubular portion that penetrates the connector flange portion 220 and a collar protrusion that extends in the radial direction from the collar tubular portion. The metal collar is insert-molded in the connector flange portion 220. By providing the collar protrusion of the metal collar, it is possible to prevent the metal collar from coming off in the axial direction.

The body projection 211 and the heat sink recess 105 are fitted via a gap. In addition, instead of the body projection 211, a body recess may be formed, instead of the heat sink recess, a heat sink projection may be formed, and the body recess and the heat sink projection may be configured to be fitted through a gap. As described above, when the connector 200 and the heat sink 100 are fitted to each other in a projection-recess shape through a gap, the assembly is easy.

The body projection or the body recess and the heat sink recess or the heat sink projection that are fitted to each other via a gap extend along the axial direction.

By fitting the fitting portion 221 of the connector to the first positioning hole 178 of the heat sink 100 (see FIGS. 18 and 19) and the first positioning recess 179 (see FIG. 19) or the first positioning projection (not shown), the heat sink 100 and the connector 200 are positioned. In the present example embodiment, a protuberance as the fitting portion 221 provided on the upper face of the connector flange portion 220, and a round hole as the first positioning hole 178 of the heat sink protrusion 104 and a cutout recess as the first positioning recess 179 are fitted.

Note that the positioning between the heat sink 100 and the connector 200 may be fitted to each other, and the shape is not limited.

As mentioned above, in the present example embodiment, the structure as an example in which the cover 30 and the connector 200 are fixed to the heat sink 100 has been described, but the motor of the present disclosure may have a structure in which the heat sink and the connector are fixed to the cover. In the latter case, an easily assembled structure can be realized by adopting a structure in which the heat sink and the connector are fitted via a gap.

In the present example embodiment, the structure as an example in which the heat sink 100 also serves as a holder for holding the bearing 43 has been described, but the heat sink of the present disclosure may be separate from the bearing holder.

In the present example embodiment, the structure as an example in which the heat sink 100 also serves as a holder that holds the coil wire C that is inserted into the heat sink through hole 110 and the coil support member 60 has been described, but the holder for holding the coil wire and the coil support member may be separate from the heat sink in the present disclosure.

The motor according to the first example embodiment of the present disclosure includes a rotor including a shaft extending in an axial direction, a stator surrounding a radially outer side of the rotor, a heat sink disposed axially above the stator, and a board that is disposed axially above the heat sink and on which an electronic component is mounted, in which the stator includes a coil around which a coil wire is wound and a busbar to which the coil wire is connected, in which the heat sink includes a first portion and a second portion that is located on a circumference identical to the first portion and that extends along a circumferential direction, in which an axial thickness of the first portion is larger than an axial thickness of the second portion, in which a lower surface of the second portion is located axially above a lower surface of the first portion, and in which the busbar is located axially below the second portion.

According to the first example embodiment of the present disclosure, the electronic component is disposed axially above the first portion of the heat sink to increase the axial thickness. Further, a space is formed axially below by reducing the thickness of the second portion of the heat sink. The busbar is disposed in this space.

In this way, the busbar can be disposed in the space formed by the second portion while maintaining the heat dissipation performance of the electronic component in the first portion. Therefore, the motor of the present disclosure can reduce the axial dimension.

Preferably, in the motor according to the first example embodiment of the present disclosure, the second portion has a recess recessed axially upward, and in which a connection portion between the busbar and the coil wire is located axially below the recess.

The coil wire is drawn axially upward from the stator coil. When the busbar and the coil wire are connected, the end of the coil wire is located axially above the busbar. Therefore, by providing a recess that is recessed axially upward in the second portion, it is possible to suppress the coil wire from coming into contact with the heat sink.

Preferably, in the motor according to the first example embodiment of the present disclosure, the heat sink further includes a fixing portion provided radially outside of the first portion.

Thereby, the fixing portion of the heat sink and the housing can be fastened by using a fastening member such as a screw. When fastening, stress is applied to the periphery of the fixing portion, so that the heat sink may be deformed. However, since the first portion is thicker than the second portion, the rigidity in the vicinity of the first portion can be increased. Therefore, deformation of the heat sink can be suppressed when the heat sink is fastened to the housing.

Preferably, in the motor according to the first example embodiment of the present disclosure, the stator includes a stator core including an annular core back and a plurality of teeth that extend from the core back in a radial direction and that are disposed in the circumferential direction, in which the coil wire includes an output wire end connected to the board and a ground wire end connected to the busbar, in which a slot is provided between the teeth adjacent in the circumferential direction, and in which at least one of a plurality of the output wire ends is drawn out from a slot identical to another ground wire end.

In this configuration, coil wires constituting different phases are drawn out from the same slot. For this reason, at least one slot from which the coil wire is not drawn can be formed. Therefore, since the volume of the heat sink can be increased, the heat capacity of the heat sink can be increased.

Preferably, in the motor according to the first example embodiment of the present disclosure, the stator includes a stator core including an annular core back and a plurality of teeth that extend from the core back in a radial direction and that are disposed in the circumferential direction, in which the coil wire includes a output wire end connected to the board and a ground wire end connected to the busbar, in which a slot is provided between the teeth adjacent in the circumferential direction, and in which the coil wire includes a crossover portion connecting the coil and the output wire end or the ground wire end, the crossover portion extending in the circumferential direction, in which the crossover portion is located axially below the heat sink, and in which at least one of a plurality of the crossover portions connects the coil located at a position overlapping the first portion when viewed in the axial direction and the output wire end or the ground wire end located at a position overlapping the second portion when viewed in the axial direction.

As a result, the output wire end, which is a coil wire drawn out from the slot, or the ground wire end can be collected at a position overlapping the second portion by the crossover portion. For this reason, in the heat sink, the first portion having a large thickness can be increased. Therefore, since the volume of the heat sink can be increased, the heat capacity of the heat sink can be increased.

Preferably, in the motor according to the first example embodiment of the present disclosure, the stator further includes a busbar holding member that holds the busbar, in which the heat sink includes an inner region and an outer region located radially outside of the inner region, in which an axial thickness of the inner region is larger than an axial thickness of the outer region, in which a lower surface of the outer region is located axially above a lower surface of the inner region, in which the inner region at least partially overlaps the electronic component in the axial direction, in which the busbar holding member is located axially below the outer region, and overlaps the inner region in the radial direction, and in which the outer region includes the first portion and the second portion.

The electronic component is disposed in the axially upper side of the inner region of the heat sink, and the axial thickness is increased. Moreover, a space is formed axially below by reducing the thickness of the outer region of the heat sink. The busbar holding member is disposed in this space.

Thus, the busbar holding member can be disposed in the space formed by the outer region while maintaining the heat dissipation performance of the electronic component in the inner region. Therefore, the motor can further reduce the axial dimension.

Preferably, the motor according to the first example embodiment of the present disclosure further includes a bearing that rotatably supports the shaft, in which the heat sink holds the bearing, and in which the bearing and the busbar holding member overlap each other in the radial direction.

Since the heat sink also functions as a bearing holder, the number of components can be reduced and the size can be further reduced. Further, since the bearing and the busbar holding member overlap in the radial direction, the axial dimension can be further reduced.

When the heat sink and the bearing holder are configured separately, the thermal resistance generated between the bearing holder and the heat sink increases. Therefore, the heat sink also functions as a bearing holder, so that the thermal resistance between the members is reduced, and the heat transferred to the heat sink can be more easily transferred to the outside.

Preferably, in the motor according to the first example embodiment of the present disclosure, the heat sink further includes an outer wall portion formed radially outer side of the outer region, and in which the outer wall portion surrounds a radially outer side of the busbar holding member.

As a result, the busbar holding member is surrounded by an outer wall portion, the lower surface of the outer region, and the radially outer face of the inner region, so that it is easy to transfer the radiant heat generated from the busbar holding member to the heat sink. For this reason, the temperature rise of a busbar, a coil wire connected to this, and the like can be suppressed.

Preferably, in the motor according to the first example embodiment of the present disclosure, an axial thickness of the outer wall portion is larger than an axial thickness of the inner region.

When the busbar is surrounded by the outer wall portion, the inner region, and the outer region, the radiant heat generated in the busbar is more easily transmitted to the heat sink. As a result, the temperature rise of the busbar and the coil wire connected to the busbar can be suppressed.

Preferably, in the motor according to the first example embodiment of the present disclosure, at least part of the outer wall portion is exposed to an outside.

By providing the face exposed to the outside, the heat transferred from the inner region and the outer region can be efficiently released to the outside of the motor. Thereby, the heat dissipation performance of the heat sink can be improved.

Preferably, in the motor according to the first example embodiment of the present disclosure, the inner region includes an inner wall portion extending axially downward at a radially inner end and a rib formed on a lower surface and extending radially outward from the inner wall portion.

By extending the ribs radially outward, the capacity of the heat sink can be increased and heat can be easily transferred radially outward, so that heat dissipation performance can be improved. Since the inner wall portion and the rib can increase the rigidity of the inner region of the heat sink, the durability against the stress for supporting the shaft can be improved when the heat sink holds the bearing.

Preferably, in the motor according to the first example embodiment of the present disclosure, the stator includes a stator core having a plurality of core backs disposed in the circumferential direction and an insulator covering at least part of the stator core, and in which the busbar holding member is fixed to a radially outer side of the insulator or an axial upper side of the core back.

Thus, the core back or the insulator is disposed on the outer peripheral side of the motor main body. Since the busbar holding member is fixed to the radially outer side of the insulator or the axially upper side of the core back, the busbar holding member can be easily disposed in the space of the outer region. Thereby, since the thickness of the inner region of the heat sink can be increased, the heat dissipation performance of the electronic component can be improved.

Further, since the busbar holding member can be brought close to the heat sink, the radiant heat generated from the busbar can be transmitted by the heat sink.

Preferably, in the motor according to the first example embodiment of the present disclosure, the second portion has a through hole through which the coil wire is inserted.

As a result, it is possible to dispose the electronic component with a relatively small heat generation amount in the outer region, and to dispose the electronic component with a relatively large heat generation amount in the inner region in the board located axially above the heat sink. For this reason, since the heat generated from the electronic component can be efficiently transmitted to the heat sink, the heat dissipation performance can be improved.

With reference to FIG. 30, an example embodiment of an apparatus including the motor 1 of the first example embodiment will be described. In a second example embodiment, an example in which the motor 1 is mounted on an electric power steering device will be described.

An electric power steering device 2 is mounted on a steering mechanism for a vehicle wheel. The electric power steering device 2 of the present example embodiment is a column type power steering device that directly reduces the steering force by the power of the motor 1. The electric power steering device 2 includes the motor 1, a steering shaft 914, and an axle 913.

The steering shaft 914 transmits the input from a steering 911 to the axle 913 having wheels 912. The power of the motor 1 is transmitted to the axle 913 via a ball screw. The motor 1 employed in the column-type electric power steering device 2 is provided inside an engine room (not shown). In the case of the column-type power steering device, since a waterproof structure can be provided in the engine room itself, it is not necessary to provide a waterproof structure in the motor itself. On the other hand, although dust may enter the engine room, since the motor 1 has a dustproof structure, it is possible to suppress dust from entering the motor body.

The electric power steering device 2 according to the second example embodiment includes the motor 1 according to the first example embodiment. For this reason, the electric power steering device 2 having the effect same as that of the first example embodiment can be obtained. That is, since the electric power steering device 2 in the second example embodiment includes the motor in the first example embodiment, the axial dimension can be reduced.

Here, although the electric power steering device 2 is given as an example of the usage method of the motor 1 of the first example embodiment, the method of using the motor 1 is not limited thereto, and it can be used for a wide range of devices such a pump and a compressor.

The example embodiments disclosed herein should be considered as an example in all points and not restrictive. The scope of the present disclosure is shown not by the example embodiments described above but by the claims, and it is intended that all modifications within the meaning and scope equivalent to the scope of the claims are included.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor comprising:
   a rotor including a shaft extending in an axial direction;
   a stator surrounding a radially outer side of the rotor;
   a heat sink axially above the stator; and
   a board that is axially above the heat sink and on which an electronic component is mounted; wherein
   the stator includes a coil around which a coil wire is wound and a busbar to which the coil wire is connected;
   the heat sink includes a first portion and a second portion that is located on a circumference identical to the first portion and that extends along a circumferential direction;
   an axial thickness of the first portion is larger than an axial thickness of the second portion;
   a lower surface of the second portion is located axially above a lower surface of the first portion; and
   the busbar is located axially below the second portion.

2. The motor according to claim 1, wherein
   the second portion includes a recess recessed axially upward; and
   a connection portion between the busbar and the coil wire is located axially below the recess.

3. The motor according to claim 1, wherein the heat sink further includes a fixing portion provided radially outside of the first portion.

4. The motor according to claim 1, wherein the stator includes:
   a stator core including an annular core back; and
   a plurality of teeth that extend from the core back in a radial direction and that are provided in the circumferential direction;
   the coil wire includes an output wire end connected to the board and a ground wire end connected to the busbar;
   a slot is provided between the teeth adjacent in the circumferential direction; and
   at least one of a plurality of the output wire ends is drawn out from the slot identical to another ground wire end.

5. The motor according to claim 1, wherein the stator includes:
   a stator core including an annular core back; and
   a plurality of teeth that extend from the core back in a radial direction and that are provided in the circumferential direction;
   the coil wire includes a output wire end connected to the board and a ground wire end connected to the busbar;
   a slot is provided between the teeth adjacent in the circumferential direction;
   the coil wire includes a crossover portion connecting the coil and the output wire end or the ground wire end, the crossover portion extending in the circumferential direction;
   the crossover portion is located axially below the heat sink; and
   at least one of a plurality of the crossover portions connects the coil located at a position overlapping the first portion when viewed in the axial direction and the output wire end or the ground wire end located at a position overlapping the second portion when viewed in the axial direction.

6. The motor according to claim 1, wherein
   the stator further includes a busbar holder that holds the busbar;
   the heat sink includes:
      an inner region; and
      an outer region located radially outside of the inner region;
   an axial thickness of the inner region is larger than an axial thickness of the outer region;
   a lower surface of the outer region is located axially above a lower surface of the inner region;
   the inner region at least partially overlaps the electronic component in the axial direction;
   the busbar holder is located axially below the outer region, and overlaps the inner region in the radial direction; and
   the outer region includes the first portion and the second portion.

7. The motor according to claim 6, further comprising:
   a bearing that rotatably supports the shaft; wherein
   the heat sink holds the bearing; and
   the bearing and the busbar holder overlap each other in the radial direction.

8. The motor according to claim 6, wherein
   the heat sink further includes an outer wall portion on a radially outer side of the outer region; and
   the outer wall portion surrounds a radially outer side of the busbar holder.

9. The motor according to claim 8, wherein an axial thickness of the outer wall portion is larger than an axial thickness of the inner region.

10. The motor according to claim 8, wherein at least a portion of the outer wall portion is exposed to an outside.

11. The motor according to claim 6, wherein the inner region includes:
   an inner wall portion extending axially downward at a radially inner end; and
   a rib on a lower surface and extending radially outward from the inner wall portion.

12. The motor according to claim 6, wherein the stator includes:
   a stator core including a plurality of core backs disposed in the circumferential direction; and
   an insulator covering at least a portion of the stator core; and
   the busbar holder is fixed to a radially outer side of the insulator or an axial upper side of the core back.

13. The motor according to claim 1, wherein the second portion includes a through hole through which the coil wire is inserted.

14. An electric power steering device comprising the motor according to claim 1.

* * * * *